(12) United States Patent
Carley

(10) Patent No.: US 7,171,467 B2
(45) Date of Patent: Jan. 30, 2007

(54) OUT-OF-BAND REMOTE MANAGEMENT STATION

(75) Inventor: Jeffrey Alan Carley, Colorado Springs, CO (US)

(73) Assignee: Engedi Technologies, Inc., Viriginia Beach, VA (US)

( * ) Notice: Subject to any disclaimer, the term of this patent is extended or adjusted under 35 U.S.C. 154(b) by 0 days.

(21) Appl. No.: 10/461,820

(22) Filed: Jun. 13, 2003

(65) Prior Publication Data

US 2003/0233450 A1 Dec. 18, 2003

Related U.S. Application Data

(60) Provisional application No. 60/388,287, filed on Jun. 13, 2002, provisional application No. 60/438,282, filed on Jan. 6, 2003.

(51) Int. Cl.
*G06F 15/173* (2006.01)
(52) U.S. Cl. .................................. 709/224
(58) Field of Classification Search ............ 709/223, 709/224, 229, 225, 220; 713/201, 182, 168, 713/1, 155
See application file for complete search history.

(56) References Cited

U.S. PATENT DOCUMENTS

| | | | |
|---|---|---|---|
| 5,309,563 A | 5/1994 | Farrand | |
| 5,367,670 A | 11/1994 | Ward | |
| 5,684,957 A | 11/1997 | Kondo et al. | |
| 5,761,428 A * | 6/1998 | Sidey ........................ | 709/223 |
| 5,848,161 A | 12/1998 | Luneau et al. | |
| 5,968,176 A | 10/1999 | Nessett et al. | |
| 6,055,575 A | 4/2000 | Paulsen et al. | |
| 6,079,020 A | 6/2000 | Liu | |
| 6,085,243 A | 7/2000 | Fletcher et al. | |
| 6,108,782 A | 8/2000 | Fletcher et al. | |
| 6,148,337 A | 11/2000 | Estberg et al. | |
| 6,189,102 B1 * | 2/2001 | Beser ........................ | 713/201 |
| 6,243,815 B1 * | 6/2001 | Antur et al. ................ | 713/201 |
| 6,366,585 B1 * | 4/2002 | Dapper et al. ............. | 370/409 |
| 6,373,838 B1 | 4/2002 | Law | |
| 6,389,464 B1 | 5/2002 | Krishnamurthy | |
| 6,408,392 B1 * | 6/2002 | White ........................ | 713/201 |
| 6,446,200 B1 * | 9/2002 | Ball et al. .................. | 713/1 |
| 6,456,306 B1 * | 9/2002 | Chin et al. ................. | 345/810 |
| 6,473,795 B1 | 10/2002 | Danielson | |
| 6,473,863 B1 | 10/2002 | Genty et al. | |
| 6,477,595 B1 | 11/2002 | Cohen | |
| 6,480,955 B1 * | 11/2002 | DeKoning et al. ......... | 713/100 |
| 6,484,261 B1 * | 11/2002 | Wiegel ...................... | 713/201 |
| 6,496,858 B1 * | 12/2002 | Frailong et al. ........... | 709/221 |

(Continued)

OTHER PUBLICATIONS

ARN, Advanced Remote Node, Workgroup products; Nortel Networks, off the internet; Copyright 1999; pp. 1-16, specifically p. 9.

*Primary Examiner*—William Vaughn
*Assistant Examiner*—Greg Bengzon
(74) *Attorney, Agent, or Firm*—John H. Thomas, P.C.

(57) ABSTRACT

A computer network management system with an embedded processor, an analog communication means and a digital interface for network management provides a system for remotely and securely managing a network. Backup power in the form of an uninterrupted power supply, or other power means as appropriate, allows the modem to provide power outage notification to a remote site. The system further provides authentication and authorization capabilities for security purposes.

24 Claims, 28 Drawing Sheets

U.S. PATENT DOCUMENTS

| | | |
|---|---|---|
| 6,553,408 B1 | 4/2003 | Merrell |
| 6,553,416 B1 * | 4/2003 | Chari et al. .................. 709/224 |
| 6,578,042 B1 * | 6/2003 | Arrouye et al. ............. 707/102 |
| 6,601,084 B1 | 7/2003 | Bhaskaran et al. |
| 6,651,190 B1 * | 11/2003 | Worley et al. ................. 714/43 |
| 6,654,891 B1 * | 11/2003 | Borsato et al. ............. 713/201 |
| 6,662,221 B1 | 12/2003 | Gonda et al. |
| 6,684,241 B1 * | 1/2004 | Sandick et al. ............. 709/220 |
| 6,700,890 B1 * | 3/2004 | Langley et al. ........ 370/395.31 |
| 6,711,613 B1 * | 3/2004 | Ewing et al. ................ 709/223 |
| 6,751,677 B1 | 6/2004 | Ilnicki et al. |
| 6,754,831 B1 | 6/2004 | Brownell |
| 6,757,297 B1 * | 6/2004 | Chin .......................... 370/469 |
| 6,894,994 B1 | 5/2005 | Grob et al. |
| 6,970,924 B1 | 11/2005 | Chu et al. |
| 6,973,491 B1 | 12/2005 | Staveley et al. |
| 6,982,953 B1 | 1/2006 | Swales |
| 2001/0056548 A1 * | 12/2001 | Blumberg .................... 713/201 |
| 2002/0052850 A1 | 5/2002 | Pillal et al. |
| 2002/0057018 A1 * | 5/2002 | Branscomb et al. .......... 307/42 |
| 2002/0116485 A1 * | 8/2002 | Black et al. ................. 709/223 |
| 2002/0165961 A1 * | 11/2002 | Everdell et al. ............. 709/225 |
| 2003/0041136 A1 * | 2/2003 | Cheline et al. ............. 709/223 |
| 2003/0088513 A1 * | 5/2003 | Gritzmacher et al. ......... 705/40 |
| 2003/0093244 A1 * | 5/2003 | Corlett et al. ............... 702/186 |

* cited by examiner

OUT-OF-BAND REMOTE MANAGEMENT STATION

CROSS REFERENCE TO RELATED APPLICATION

The present application claims priority from U.S. Provisional Application Ser. No. 60/388,287 filed Jun. 13, 2002 and U.S. Provisional Application Ser. No. 60/438,282 filed Jan. 6, 2003. The present invention is related to the invention described in co-owned, co-pending patent application Ser. No. 10/461,827 filed on Jun. 13, 2003, incorporated herein by reference.

TECHNICAL FIELD OF THE INVENTION

The present invention relates in general to methods and apparatus used in communications over a telephony network and more particularly to methods and apparatus for secure communications of remote management and monitoring of network elements and reporting the status of the elements.

BACKGROUND OF THE INVENTION

In computer networks with remote networking devices such as routers and switches and, in particular, Cisco routers and switches, it is useful to attach a modem to the console port or auxiliary port of the remote networking device in order to provide "out-of-band" access to the device console for remote management. In this context "out-of-band" refers to providing connectivity to the console port through means other than through the primary data network of which the networking device is a part. For instance, the alternative connectivity could be a Public Switched Telephone Network (PSTN) as shown in FIG. 1. Some of the uses of this "out-of-band" access include allowing an engineering group to initially configure the networking device through this access and using the connection for ongoing maintenance activities. Password Recovery on a Cisco router also requires connectivity to the console port. The "out-of-band" access via the modem can also be used during diagnostic procedures when there is an issue with the networking device's primary data network connectivity possibly isolating the device from the primary network. Visibility to the entire site may have been lost. The lack of or improper functioning of an "out-of-band" connection can significantly increase the mean-time-to-repair (MTTR) for a site. When visibility to a remote site is lost, it is useful to determine if there is still power at the site as part of the problem determination procedures. One way to do this is to call the modem attached to the networking device. If the modem answers then there is power at the site. Then the modem can be used to access the networking device to try to determine if the problem is with the router, the switch, the Data Service Unit (DSU), the local loop, or some other element in the primary network.

However, there are also risks involved with placing a modem on the console port of a networking device, including Cisco devices. First, any perimeter security for the network, such as firewalls and access-lists, has just been completely bypassed providing a vulnerable point for intruders to attack. The Router Security Configuration Guide published by the National Security Agency indicates on page 47 says, "Permitting direct dial-in to any vital piece of network infrastructure is potentially very risky . . . " and on page 49, "It is okay to leave a connection to the console port attached all the time, but that terminal (or computer) should be standalone, and protected from unauthorized access." If an attacker knows or can determine the phone number of the modem then the only security is the logon protection on the networking device itself.

A typical scenario for centrally managed login and privileged mode access control to a Cisco router either via the console or auxiliary (AUX) port or via the in-band network using telnet would use an Access Control Server (ACS) and either the Remote Authentication Dial-In User Service (RADIUS) protocol or Terminal Access Controller Access Control System (TACACS+). Note that the password travels in the clear between the remote user and the router either over the telnet connection or over the connection from the user to the console port. The password can be encrypted between the router and the ACS. FIG. 2 illustrates the typical steps in logging into the router or attempting to enter privileged mode as itemized below:

a. The user connects to the router either by dialing into the console port or by telnet to the router.
    b. The router informs the ACS of the attempted connection and the ACS has the router issue a userid prompt.
    c. The user returns the userid and the router passes the userid to the ACS.
    d. The ACS has the router issue a password prompt.
    e. The user enters the password (which travels as clear text between the user and the router) and the router passes the password to the ACS (can be encrypted between the router and the ACS).
    f. The ACS compares the userid and the password with its database and if the password is the correct password for the userid the ACS informs the router.

Another authentication scenario often used for dial-in security at a network perimeter is a challenge handshake with central authentication and authorization using the radius protocol to communicate with the ACS. This is illustrated in FIG. 3. Note that the shared secret string or password shared between the ACS and the remote user is never communicated over the network during authentication. Here are the steps that would be typical when a remote user is attempting to connect into the network and the network wants to authenticate/authorize the remote user:

a. The remote user dials into the Network Access Server (NAS) via PSTN or Integrated Services Digital Network (ISDN)
    b. The NAS (or the ACS via RADIUS) issues a prompt for the userid and after getting the userid issues a prompt for a password.
    c. The NAS has the ACS via RADIUS verify the userid and password. If they are authenticated then the NAS (or ACS via radius) issues a challenge in the form of a generated random number.
    d. The remote user has access to a calculator or method of encrypting the random numbers that is configured with a shared secret string (shared with the ACS).
    e. The remote user uses the calculator to encode the challenge to come up with what is essentially a one-time password (OTP) based on the random number.
    f. The remote user responds to the challenge from the NAS with the OTP.
    g. The NAS passes the OTP to the ACS via radius and if the ACS agrees that the challenge was properly encoded with the shared secret string that the ACS shares with the remote user then the remote user is authenticated. The ACS can also inform the NAS via radius about what activities the user is authorized for.

Another complication with connecting to the console port of a router or switch is that the router or switch typically is not aware of the status of connections to the modem. If a user is dialed into the console and hangs up or is somehow disconnected from the modem without logging out of the networking device, another call can come into the modem and the new caller will inherit all the privileges of the previous caller without even having to log in. On page 49, the Router Security Configuration Guide says, "The connection to the console port should not be left logged in. Configure the console line to time out, so that if an administrator forgets to log out, the router will log him or her out automatically", but this still leaves a window of opportunity for an attacker. Also, if the networking device is using some form of centralized authorization and/or authentication of users for access to the networking device such as that described above and the networking device has lost connectivity to the ACS, then the networking device will not be able to use the centralized authentication method to authenticate and authorize the user. Typically, in this situation, the networking device reverts to an alternative method of authorization such as a global (enable) password that is generally less secure that the centralized authentication of users. If an attacker knows the global password and there is a network outage or the attacker can perform a denial-of-service attack on the ACS then the device is very vulnerable.

An attacker could also perform a denial-of-service attack on the console port as well. Even if an attacker does not have the credential to be authorized to the port connected to the modem they can dial that port repeatedly tying up the line and denying its use to an authorized user.

Even with these risks, some network administrators will still put modems on the console ports of networking devices in the network. For them, the utility of having the modem on the networking device outweighs the risks, even though they would rather not have the risks. Other network administrators have made the choice of using modems that require a user name and password or require unique tokens be generated or the use of smart cards. Typically it is only the top of the line modems that provide this feature and even then they are limited with respect to the number of users that can be configured and the administration of the user names and passwords is such a nightmare that often only one user name and password gets configured and everybody uses the shared password. In large enterprise networks the most frequent decision is that the risks are too great and as useful as the modems on the console ports would be, they will not be allowed. The only place they will allow modems is on Network Access Servers (NAS) where strong authentication and authorization can be performed.

Even when a modem is placed on the console port of a networking device, such as a router, it is not always clear that the modem and analog line were working correctly prior to a network outage. Therefore, if the modem does not answer during problem determination, it is not as strong an indicator as one would like, that the site has lost power. It could be that some portion of the "out-of-band" connection has malfunctioned or been disconnected previously without being detected. Also, if the modem or analog line is not working correctly, a valuable tool that has been shown to shorten MTTR has been lost. If there is a problem with the "out-of-band" path it needs to be found and corrected before there is an outage in the primary network, not when there is an outage. It is important to be able to quickly determine if a site has lost power.

Another difficulty with the "out-of-band" connection, particularly when connecting to Cisco devices, is the configuration and management of the modem. A modem can often be configured by having the Data Terminal Equipment (DTE) it is attached to send it commands (often using some variation of the AT command set). However, the console port on many Cisco devices will not allow you to enter these configuration commands to the modem. This could result in a technician needing to be dispatched if a modem's configuration has been scrambled or the modem needs to be reconfigured. Dispatching a technician could cost more than the modem.

To get around this problem, some network administrators have connected the modem to the networking device's AUX port rather than the console port. If the modem is connected to the AUX port on a Cisco router it is often possible to do a "reverse telnet" to get to the modem and change the settings (for instance using the AT command set). Also, with certain configurations, the AUX port can detect when a remote user hangs up or is disconnected and is therefore not as vulnerable to the security hole of allowing the next caller to inherit the privileges of the previous caller. Unfortunately, some tasks, such as password recovery, require a connection to the counsel port of the networking device. When the modem is connected to the console port a technician can remotely recover the password though password recovery usually requires someone local to the networking device to turn the power for the device off and then back on. It would be useful to be able to perform password recovery without requiring a person to "cycle" the power to the networking device. Also, when the modem is connected to the console port, the remote technician can receive status messages of the boot process for the equipment but they do not receive this information from the auxiliary port.

An additional vulnerability for the "out-of-band" connection is eavesdropping. The information from the user to the networking device is traveling over the alternate connection in the clear. For instance, if an analog telephone line is being used and the line is tapped, the eavesdropper would be able to see all the information traveling between the user and the networking device. Often, this can include the device configuration including the passwords. Even in the situation where a modem is being used that requires a user name and password, some protocols will allow that user name and password to be captured.

Problem isolation and determination would be enhanced if the technician also had "out-of-band" access to the console ports of several networking devices at a site such as the DSU, probes, sniffers, switches, power managers, etc. However, not only is the capital cost of the modems for each of these console ports an issue, but there would also be the operational costs of the analog lines for each of these devices. In general, the benefits have not been seen to be worth the cost.

An object of the invention is to provide a system for remotely managing a computer network.

Another object of the invention is to provide a system for remotely managing a computer network which provides improved security for authenticating, authorizing and controlling use of the network by remote users.

Another object of the invention is to provide a system for remotely managing a computer network which allows for remote management and configuration by network administrators.

Another object of the invention is to provide a system for remotely managing a computer network which monitors network connections and analog connections and provides status updates.

Another object of the invention is to provide a system for remotely managing a computer network which monitors network connections and analog connections and provides notices if either connection is lost.

Another object of the invention is to provide a system for remotely managing a computer network which can encrypt communications between the network and a remote user.

Another object of the invention is to provide a system for remotely managing a computer network which monitors the network power supply and provides status updates.

Another object of the invention is to provide a system for remotely managing a computer network which monitors the network power supply and provides notice if the power supply fails.

Another object of the invention is to provide a system for remotely managing a computer network which monitors connections for possible attacks and reports possible attacks to Intrusion Detection System management software.

Yet another object of the invention is to provide a system for remotely managing a computer network which can remotely interrupt power to a device connected to the computer network.

Yet another object of the invention is to provide a system for remotely managing a computer network which monitors connection attempts made through the analog connection.

A further object of the invention is to provide a system for remotely managing a computer network which can selectively block connection attempts made through the analog connection means.

Finally, it is an object of the present invention to accomplish the foregoing objectives in a simple and cost effective manner.

SUMMARY OF THE INVENTION

The present invention addresses the foregoing problems, as well as other problems, by providing an exemplary embodiment that provides the features needed to effectively manage a remote device including secure modem connectivity. The management device will be referred to as a Remote Management Station (RMS).

The RMS incorporates a number of features in order to address the foregoing problems. While the features are incorporated into the RMS in the primary preferred exemplary embodiment, they can also be applied in areas other than just the RMS. In some cases, additional exemplary embodiments are provided. However, the lack of an exemplary embodiment for a particular application of the inventive feature does not imply that the application is not protected by the claims.

The RMS has the standard connections of a modem consisting of an interface to a telephone line and a Data Circuit-terminating Equipment (DCE) interface for a connection to Data Terminal Equipment (DTE). In addition, the RMS may include one or more additional network interfaces as illustrated by FIGS. 4–8. One or more of the additional network interfaces could be used for reporting status information to a network management station and for allowing for remote configuration of the RMS. This network connection could also support a network protocol (such as Transmission Control Protocol/Internet Protocol (TCP/IP)) and application protocols (such as Simple Network Management Protocol (SNMP), Telnet, The Hypertext Transfer Protocol (HTTP), or Secure Shell) to facilitate this remote reporting and configuration as well as allowing network users access to the RMS. The connection to the primary in-band network could be a serial interface as depicted by FIG. 5 and FIG. 8, a local area network (LAN) connection as depicted by FIG. 6 and FIG. 7 or any other type of network connection. As depicted in FIG. 7 the RMS can support multiple connections to the primary data network. Additional RMS connections could also be included for connections to additional DTEs as depicted in FIG. 7.

The existence of a network connection to the primary data network also allows the RMS to implement client protocols for centralized Authentication, Authorization, Accounting, and Auditing (AAAA) the same as many other networked devices do. An example of such a protocol would be RADIUS. This would allow the RMS to do strong authentication and authorization by connecting to a centralized server like Cisco's Access Control Server and eliminate a security hole. FIG. 4 illustrates an ACS in the network for the RMS to access.

In the event that the RMS does not have a management connection or is unable to connect to the centralized server, as would be the case if the RMS's connection to the primary data network were down, the RMS can perform a new mode of authentication and authorization referred to here as isolated challenge mode (ICM). The isolated challenge mode requires the remote user dialing into the RMS to have network connectivity to a centralized authentication and authorization server to perform the authentication and authorization of the user. ICM can authenticate a user connecting to the RMS or can perform mutual authentication.

The Isolated Challenge mode of authentication and authorization has strong benefits anytime a networked device or user is connecting to an isolated device and centralized authorization and authentication are desired. For example, this could include not just a networked user connecting to an isolated RMS, but a backup link being established from a central router to a remote router when an outage has occurred allowing the central router to implement policy decisions on which backup links are most critical in the event of a major outage while still allowing the isolated remote router to centrally authenticate and authorize the connecting device.

Another example of the usefulness of the isolated challenge mode of operation can be shown using Cisco routers. Today, Cisco routers allow you to specify a sequence of authentication and authorization methods and these methods are tried in order until a method is able to accept or reject an authentication or authorization. For instance, a router may have specified to first try TACACS+ and then try local authentication (user name and password configured on the router). If the router has lost connectivity with the TACACS+ server for whatever reason then centralized authentication and authorization (and auditing) is gone. The same would be true of authorizing the ENABLE privileged mode on the router. If the connection to the TACACS+ server is down then the router might be configured to accept an enable password configured on the router. Often these passwords that are configured locally on the routers are configured the same on every router in order to administrate the process and these passwords can become well known. The isolated challenge mode could be the second choice of authentication if the connection to the TACACS+ server is down. This would allow continued use of centralized authentication of the connecting user even when the router is isolated (using the same database the TACACS+ server is using).

The user can connect to the RMS in several roles. They can connect to the RMS as a user desiring to connect to a serial port and will be authenticated for the specific port they are trying to connect to, they can connect as a network performance management operator gathering performance statistics for the RMS, they can connect as a network management administrator, or they can connect as a network management security administrator for the RMS. The Protection Profile for Switches and Routers, incorporated herein by reference, available from the Information Assurance Technical Framework (IATF) provides more information about these rolls.

While the RMS would be performing the isolated challenge authentication and authorization in a terminal mode as described above, other situations could make use of a frame or packet based isolated challenge mode. Both terminal mode and packet mode isolated challenge authentication will be discussed in more depth.

The RMS can be configured to connect the users to serial ports in multiple modes. Passthru mode would cause the user to be connected to a default port immediately without any authentication. This would be analogous to how most modems work today and bypasses the advanced features of the RMS. In authenticated passthru mode the user is first authenticated and then enters passthru mode to the default or specified serial port. In secure mode the user is authenticated and then establishes an encrypted connection between the user and the RMS.

The secure mode of operation of the RMS allows information that would otherwise be transmitted in clear text between the user and the router to be encrypted by the RMS and be protected between the RMS and the user. The information would only be in clear text between the router console port and the RMS and both these devices should be physically secured together. Since some of this information could be router configurations and passwords, protecting this information is vital.

Allowing the RMS to be configured in passthru mode could cause an RMS operator or administrator to not be able to log into the RMS in a role other than user, if the RMS does not have a management connection or that connection is down. If the RMS is configured for passthru operation and is monitoring the console connection of a router, a message could be sent to the console of the router that would cause the RMS to revert to a mode where the operator or administrator can log on. Another alternative is for a specified modem negotiation sequence for the remote modem to change the mode of the RMS to allow the operator or administrator to log on.

There are multiple methods for the RMS to report status information to monitoring stations or for the RMS to allow for remote configuration of the RMS. The existence of a network connection from the RMS to a data network allows the RMS to regularly report on the status of the RMS and its connections. This status information can be reported via standardized means such as Simple Network Management Protocol (SNMP), or via private protocols, or a combination of both. Some status information can also be reported using the PSTN connection. This is especially important if status information is to be communicated when the RMS connection(s) to the data network(s) is (are) down. An example of this could be if the serial connection to the console port of the router looses the Data Terminal Ready signal indicating the console port has either been unplugged or gone down. The RMS can be configured to dial a determined number and report this outage over the PSTN.

It is also possible to configure the RMS to monitor the console port for information that is logged to the console, filter the console messages, and dial out and send an alert over the PSTN for certain error conditions such as a particular interface going down. If the interface that went down were the interface the router would normally have sent the alert over then this might be the only way the alert gets sent.

The RMS can also be configured to execute a macro before a call is connected to a serial port or when a call is disconnected from a serial port. In the case of the serial port being connected to a Cisco console a major advantage of this would be or automatically have the RMS log out a user from the console as soon as a call becomes disconnected and not allow any new called to connect to that port until the previous user has been disconnected. This can be used to force each user to log in with their own userid without any risk of them inheriting the previous users privileges without logging in.

The connections from the RMS to the data network(s) allow users to connect to the RMS and gain access to the DTE connections from the RMS using the primary data network as shown in FIG. 19 in addition to the connection to the RMS via the PSTN network. This can reduce long distance charges and provide for a faster connection when the primary data network connection(s) are up. In addition, the user has the option of connecting to the RMS in secure mode over the network, protecting the information from the user to the RMS and then connecting from the RMS to the console port of the router over the serial interface. As shown in FIG. 20 the RMS could also be configured to allow the user to connect to the RMS in secure mode and then connect to the router over a network connection using Telnet. This would still protect the information from the user to the RMS and only expose the information as clear text from the RMS to the router. If the connection from the RMS to the router were a physically secure back-to-back Ethernet connection, the exposure of the information would virtually be eliminated. This would be useful where it is impractical to implement an Internet Protocol Security (IPSec) connection to the router for management or where the router software does not yet support IPSec or Secure shell.

The RMS includes a means of automatically monitoring the status of the connection to the telephone network. This monitoring can be accomplished by measuring the voltage levels of the telephone line with a circuit similar to FIG. 21 and/or by periodically taking the line off-hook and checking for dial tone as shown in the flow chart in FIG. 28. If the RMS detects the connection to the telephone network is malfunctioning it will notify a monitoring station using the management connection over the primary data network.

The RMS can also use the network connection to communicate with a Test Server to coordinate periodic end-to-end tests of the PSTN connections. The Test Server can be configured to dial into the RMS to verify RMS in-bound call operation and the Test Server can request the RMS to call the Test Server to verify RMS out-bound call operation. FIGS. 23–26 depict this test coordination.

The RMS can also monitor an external power source. If the RMS detects a power loss from its external power source, it will dial a configured number on the PSTN network and notify a monitoring system of the power loss. This could requires a UPS for powering the RMS while it is notifying the monitoring platform of the power failure as depicted in FIGS. 5–7, or the RMS could use telephone line powered circuitry for reporting the power failure as depicted in FIG. 8. The RMS can also be configured to provide power-up notification when the RMS is powered up from external power and completes initialization. The RMS can provide the power-up notification using a data network connection if it is active or the RMS can dial a configured telephone number on the PSTN network and provide the power-up notification. If the RMS is connected to the same power source as other equipment then the RMS is effectively monitoring the power supply for the other equipment as well.

The RMS can also provide a means of "cycling" the power for another device such as a router. Allowing an administrator to power cycle a router and connect to the console port could save needing to send a technician to a remote site for certain operations such as password recovery. While logged into the RMS the remote technician can cause the router to be power cycled and then connect to the console port to perform password recover.

In order to defend against denial-of-service attacks on the PSTN line the RMS receives Caller Identification (Caller ID) on the calls it receives. If calls from the same phone number consecutively fail authentication a certain number of times, calls from that number will be answered and immediately disconnected for a certain length of time. Notification of the attack can be made over the management connection as well. If the RMS does not have a management connection or the management connection is down the RMS can be configured to report the attack by dialing a configured number and reporting the attack over the PSTN.

Another method of protecting against a denial-of-service attack on the PSTN line is for the RMS to be able to securely connect to an application that works with the PSTN local loop provider to manage call blocking. This is depicted in FIG. 27. This application would allow a subscriber to dynamically change a list of numbers to allow or block calls from as well as change if calls without the calling number being available will be accepted. This application would allow PSTN numbers originating attacks to be blocked in the provider network leaving the local loop to the RMS available for calls from authorized users.

DETAILED DESCRIPTION

Figure 4:
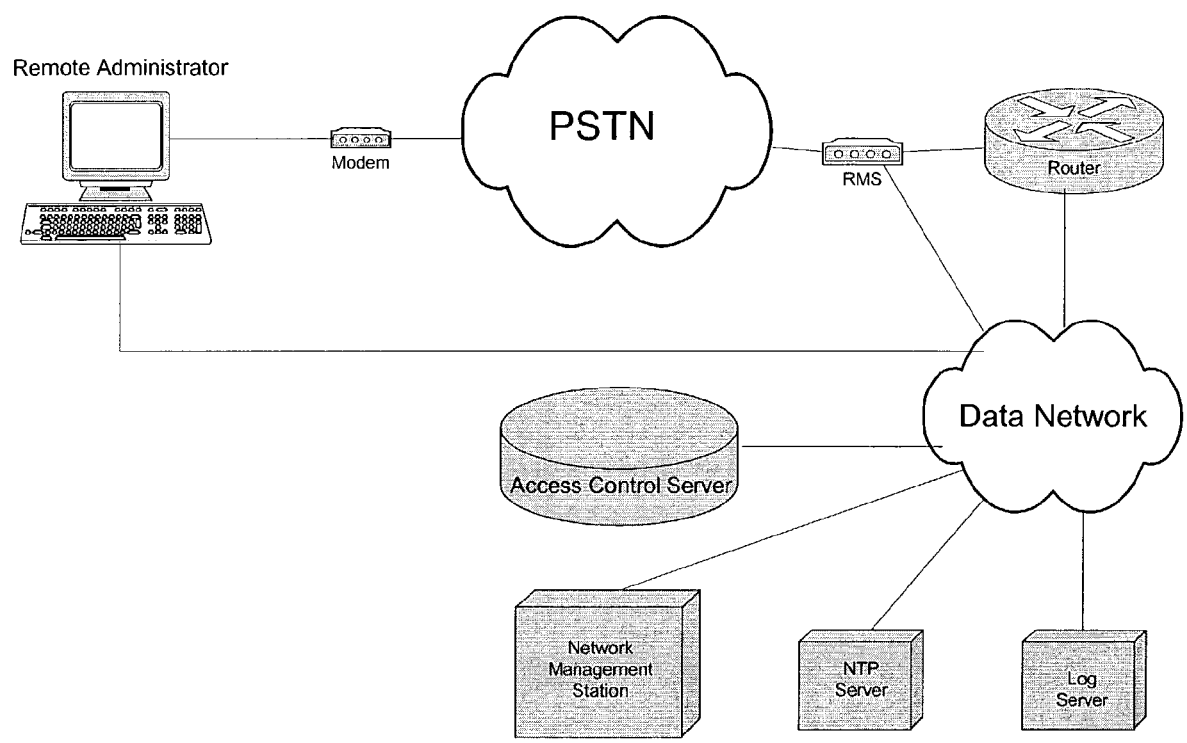
FIG. 4 Illustrates an RMS connection both to a router console port, a PSTN, and a data network.
Figure 5:
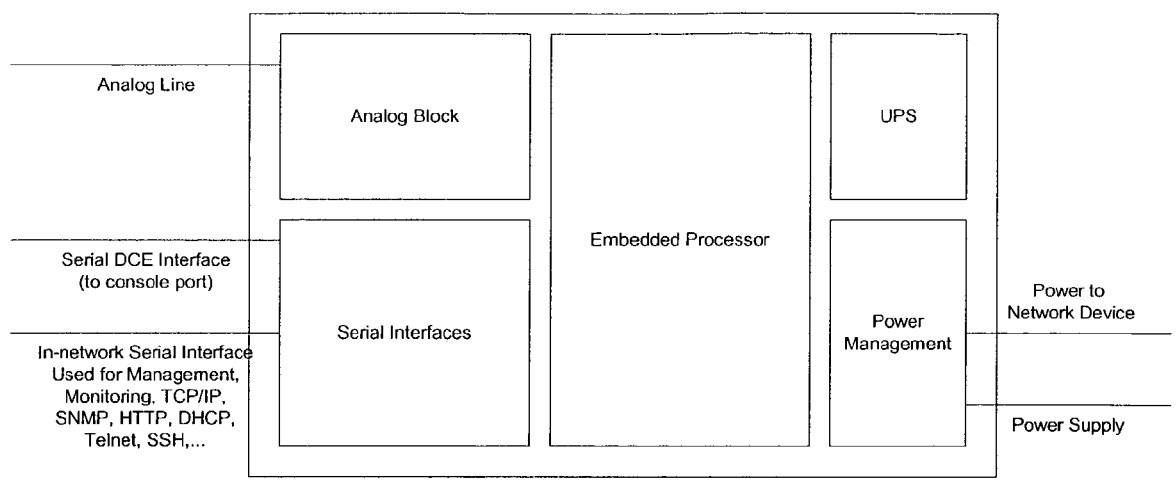
FIG. 5 Illustrates a logical component breakdown of a preferred exemplary embodiment of the present invention.
Figure 6:
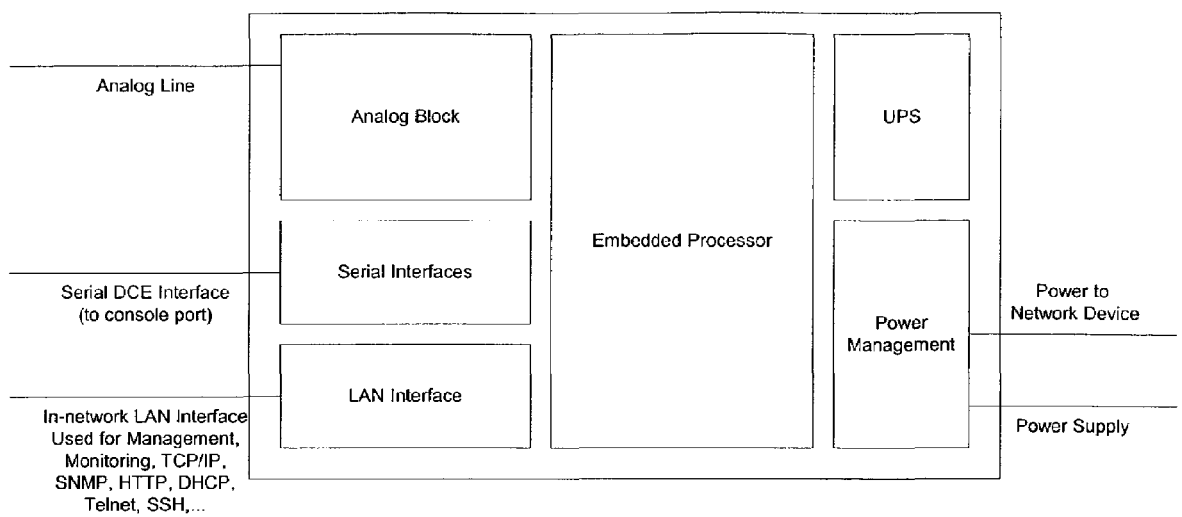
FIG. 6 Illustrates a logical component breakdown of an additional preferred exemplary embodiment of the present invention.
Figure 7:
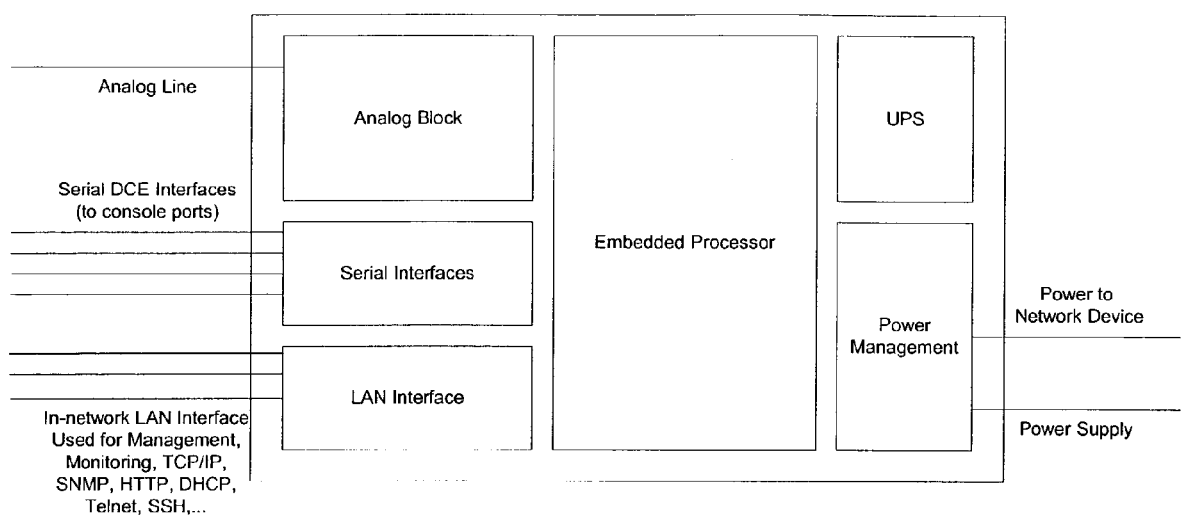
FIG. 7 Illustrates a logical component breakdown of an additional preferred exemplary embodiment of the present invention.
Figure 8:
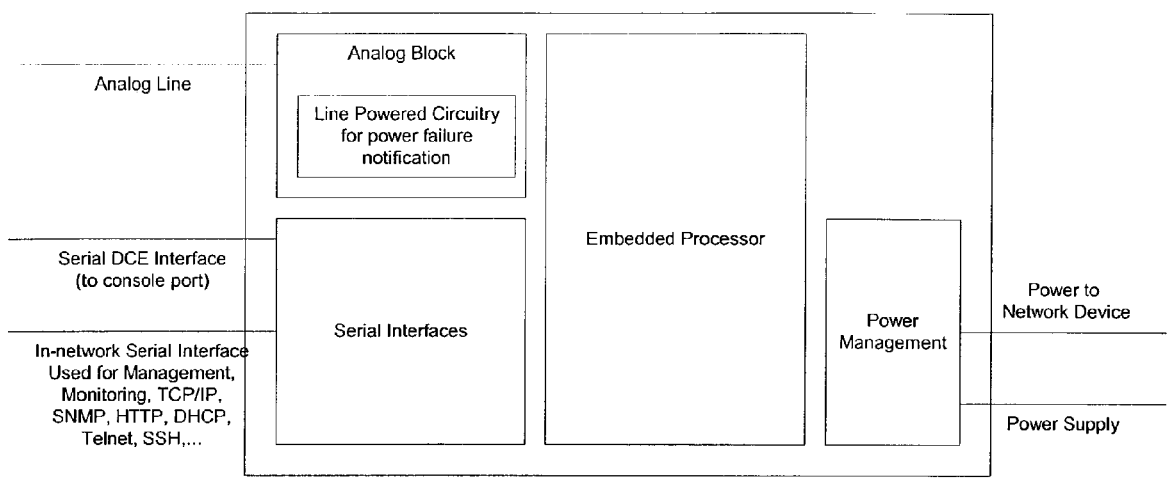
FIG. 8 Illustrates a logical component breakdown of an additional preferred exemplary embodiment of the present invention.

The preferred exemplary embodiment of the Remote Management Station (RMS) of the present invention, as illustrated in FIGS. 5 through 7, comprises a management station to assist a remote network administrator in securely managing a networking device such as a router or switch in an environment such as that depicted in FIG. 4. The RMS provides the remote operator with a number of capabilities that will be looked at individually. Having an embedded processor in the RMS facilitates these capabilities. The embedded processor includes all the components necessary for stand-alone operation such random access memory (RAM), read-only memory (ROM), nonvolatile random access memory (NVRAM), and Flash memory. At times when the embedded processor receives signals from the analog block it will forward the signals to the serial port. At other times, as discussed below, the embedded processor will take other actions concerning signals received from the analog port.

The RMS has one or more network ports for connection to a data network. This network connection could be a serial connection as depicted in FIG. 5, a LAN connection as depicted in FIGS. 6 and 7, or any other suitable network connection. The RMS will run a suitable networking protocol such as Internet Protocol (IP) over the network connection. This network connection allows the RMS to take advantage of many services available in the network such as network management applications, Network Time Protocol Servers, Log Server, Access Control Servers, and providing remote access to the RMS over the data network using HTTP, Telnet, or Secure Shell as well as others.

The RMS has the capability to provide management information to a network management station. This could be implemented via standardized protocols such as SNMP or via proprietary protocols. The RMS can be configured to allow a remote network management station to query the RMS for information and/or for the RMS to initiate sending information to the network management station. The RMS can be configured to send selected information on a periodic basis as well as send selected information when specified threshold conditions are met or error conditions occur. This is referred to as setting traps for information to be sent. Some management protocols also allow operating parameters of the RMS to be changed by the remote administrator using the protocol and the data network.

Using the data network connection the RMS can have access to a Network Time Protocol (NTP) Server and a log server. The NTP server allows the RMS to maintain an accurate time source and to use the time source for time stamping log information. The RMS could also log events both locally and remotely at a log server over the network. Keeping proper log and audit information is a vital part of network management.

The in-band network connection also allows the remote network administrator to access the RMS for monitoring and configuration management using the data network as well as through the analog line. The remote administrator could use Telnet, Secure Shell, or some other appropriate remote terminal protocol to access the RMS. They would then be able to display information about the operation of the RMS or change the configuration of the RMS. This could save on toll charges for connecting to the RMS. The RMS can also be set up to allow the remote administrator to use HTTP, or Hypertext Transfer Protocol over Secure Socket Layer (HTTPS) and their web browser to access the RMS.

The in-band network connection on the RMS would also allow a remote administrator to access a console port connected to the serial port of the RMS over the data network. The remote administrator connects to the RMS over the data network using a remote terminal program such as Telnet or Secure Shell or using HTTPS and then would establish a connection through the RMS to the console port. This could save on toll charges for connecting to the console ports or remote devices.

An additional service the RMS can utilize through the in-band connection is an Access Control Server (ACS). The RMS will run a client for authentication and can communicate with one or more ACS using standardized protocols such as RADIUS or proprietary protocols. This would allow the RMS to authenticate and authorize users connecting to the RMS and determine their privileges on the RMS and what ports they are authorized to connect to. If a protocol such as TACACS+ is being used the RMS would also be able to provide accounting information to an ACS.

Figure 1:
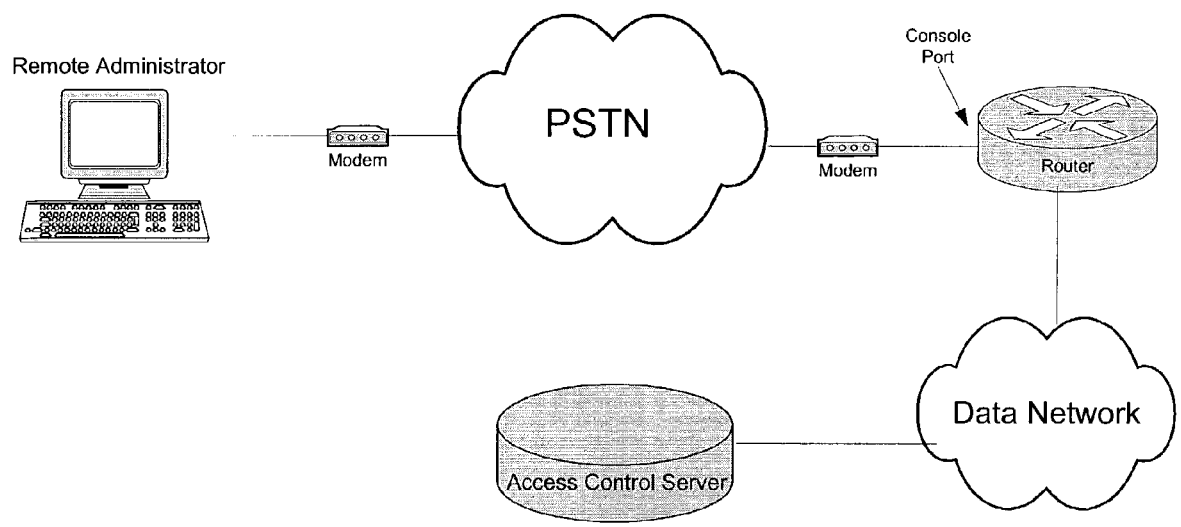
FIG. 1 Illustrates a typical setup of a modem connection to a network device such as a router.
Figure 2:
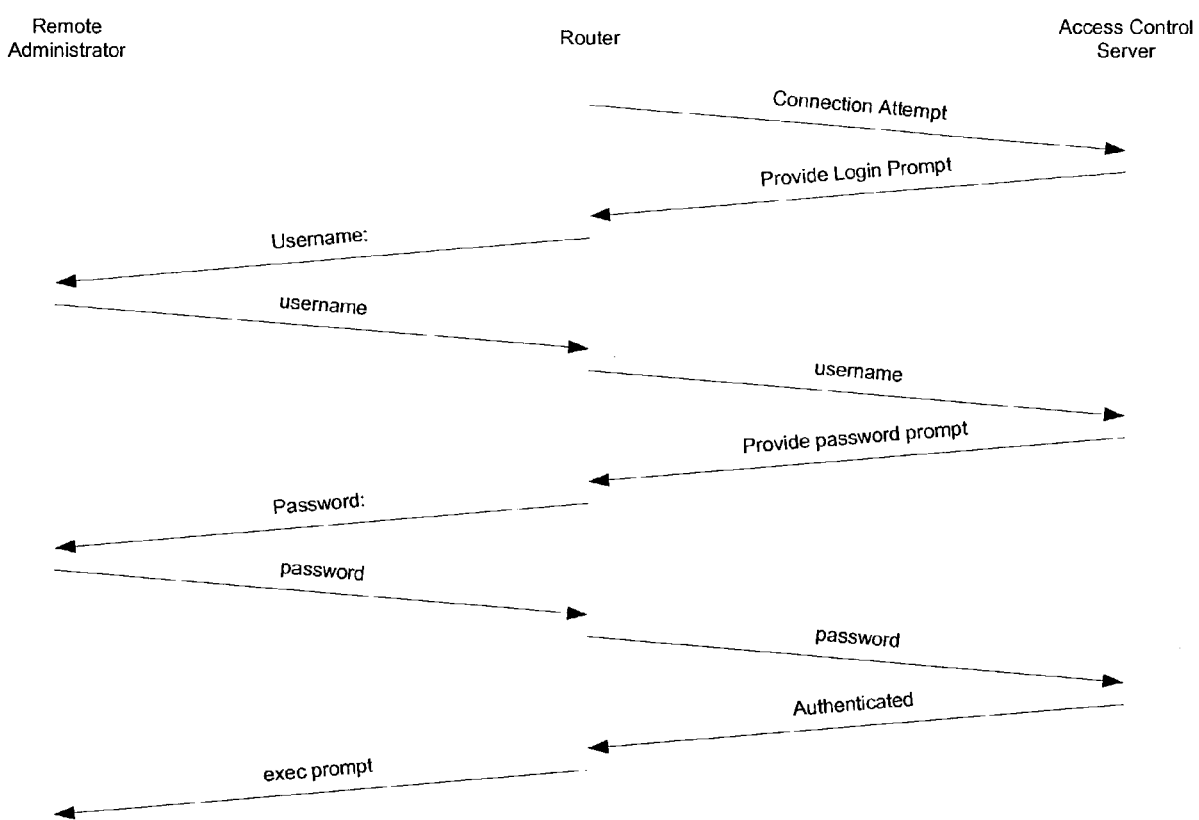
FIG. 2 Illustrates typical password protection on a router using TACACS+ and an ACS.
Figure 3:
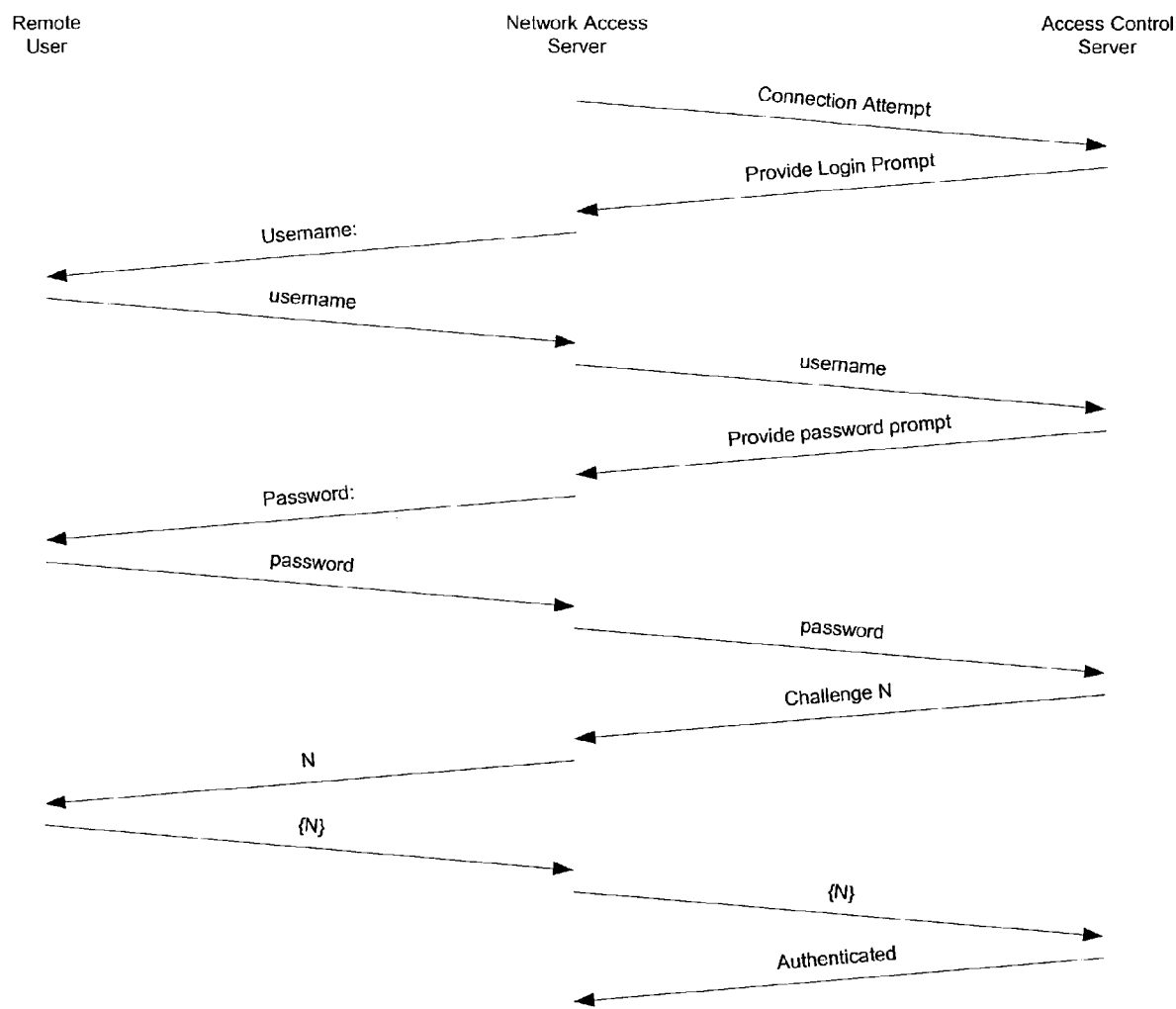
FIG. 3 Illustrates typical password and challenge protection on a Network Access Server using RADIUS and an ACS.

The advantages of using an ACS connected over the network is the user information, passwords and privileges can be configured on one central system rather than having to be configured in every device in the network. For larger networks with a large number of administrators centralized authentication is mandatory. The RMS would be able to perform authentication and authorization as depicted in FIGS. 2 and 3 using the connection to an ACS over the data network.

However, there are times when the RMS may not be able to connect to an ACS. This could be cause by a portion of the path in the data network between the RMS and the ACS being down causing the RMS to not be able to use an ACS to authenticate or authorize users attempting to connect to the RMS. The RMS is not unique in experiencing this problem; any device that uses an ACS for centralized authentication control shares it. The device must either not allow any users to connect, allow all users to connect, or perform authentication by some other means. A Cisco router, for instance, will have a list of methods for authentication. If the first method on the list is not available for authentication, then the second method is attempted. That method might be a local database on the device, which is not practical in a large network, or a common password everybody who ever needed to know it (and then some) knows.

The RMS implements a new authentication and authorization method called ICM that can be used when the RMS does not have connectivity to an ACS, though the RMS can be configured to use ICM for authentication even when it does have connectivity to an ACS. In a large organization it would not be unreasonable to expect the remote administrator to have access to the data network and hence to an ACS. Therefore, an ACS can still be used to authenticate and authorize the user to the RMS using the centralized database. Any device can use ICM when a user is attempting to connect to the device and it is reasonable to expect the user to have connectivity to an ACS.

In a preferred exemplary embodiment of ICM using public/private key pairs the RMS or server for the connection holds a private key KS unique to itself and never reveals that key. Authentication servers on the network hold the public key Ks of the pair and they are free to distribute that key to others. The ACS servers on the network also hold a private key KACS from another public/private key pair for authentication and the RMS or server holds the public key Kacs of the pair. It is preferred that each ACS has its own private key for authentication though it would also be possible for all the ACSs to share one private key for authentication. Another implementation would have the ACS hold a unique private key for each RMS or server they are providing authentication for. The ACS also has access to the user information and their resource authorization information.

Figure 9:
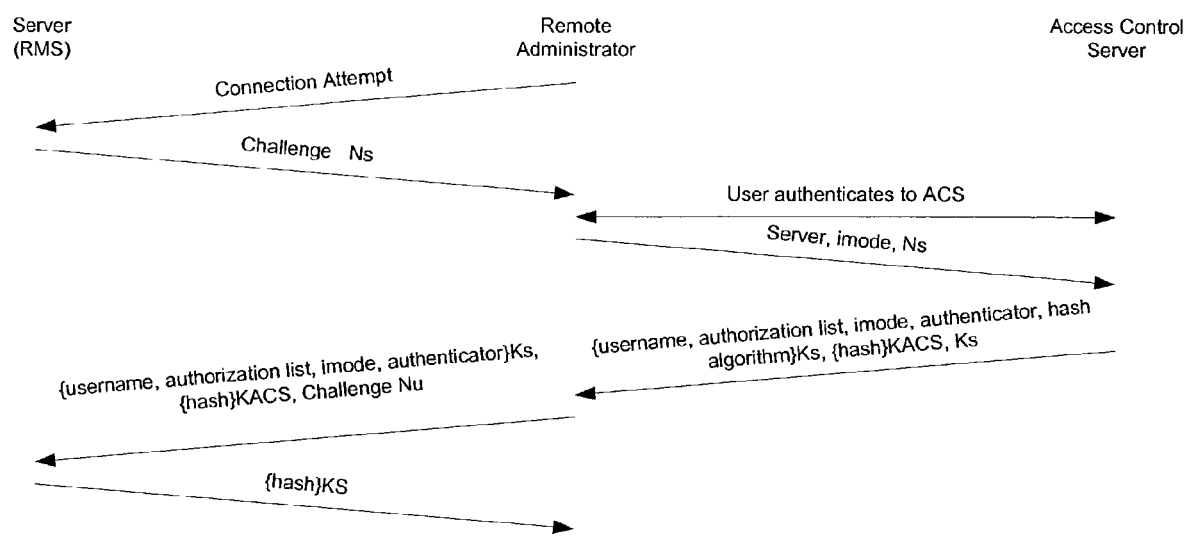
FIG. 9 shows sample flows used for an exemplary embodiment of Isolated Challenge Mode Authentication.

As depicted in FIG. 9, when a remote administrator or user attempts to connect to the RMS, or any device implementing ICM authentication, the RMS will issue a challenge typically in the form of a random number N. The subscript s is added to indicate this is a random number generated by the RMS which is the server in this connection attempt. Ns is sent to the remote administrator or user attempting to connect to the RMS. The remote administrator has connectivity to an ACS and has either already authenticated them self to the ACS or needs to do so at this time. How the remote administrator authenticates them self to the ACS is determined by the security policy for the network and can vary depending on the needs of the network and the security requirements for the information or device being accessed. The remote administrator will send to the ACS what RMS or server they are trying to access, the initial mode they want to enter on authentication, and Ns sent to them by the RMS. The ACS already has the information about the remote administrator.

The ACS will prepare a message to be sent to the RMS via the remote administrator. This message will include the username of the administrator being authenticated, their authorization information, their initial mode to enter on authorization (can be defaulted), optionally the name of the ACS doing the authentication, and the hash algorithm the ACS is going to use. This information should be encrypted using the public key of the RMS, Ks, in order to protect the confidentiality of the information being sent though it does not need to be encrypted for the integrity of the authentication process. The ACS will then generate a hash from the prepared message using the hash algorithm identified in the prepared message providing integrity for the information being sent and will encrypt the hash with its private key KACS. This will allow the RMS to verify that the message has not been tampered with. The ACS will then send the message encrypted with Ks and the hash encrypted with KACS to the remote administrator. Optionally, the ACS can also send the remote administrator the RMS's public key in order to allow the remote administrator to authenticate the RMS.

The remote administrator will then send the message encrypted with Ks and the hash encrypted with KACS to the RMS in response to the challenge Ns. If the remote administrator wants to authenticate the RMS the remote administrator will also generate a challenge of its own, Nu, and include it in the message sent to the RMS.

The RMS can now use KS to decrypt the message encrypted with Ks and will know the username attempting to connect, their authorization, their initial mode of operation, the name of the ACS providing authentication, and the hash algorithm the ACS used. The ACS hashes this information along with the original challenge Ns. It also uses Kacs to decrypt the hash encrypted with KACS and compares the two hashes. If the two hashes are the same the RMS knows the message is authentic and can act on it. If the remote administrator included a challenge Nu, the RMS will encrypt the challenge with its private key Ks and sent the result to the remote administrator. The RMS will encrypt the challenge Nu with its private key KS and return the result to the remote administrator. The remote administrator will then be able to use the public key sent to it by the ACS to decrypt the results returned by the RMS to authenticate the RMS. Because the ACS is trusted, the remote administrator only needs the public key itself and not the trust chain. Mutual authentication has taken place without any usernames or passwords being transmitted in the clear.

Figure 10:
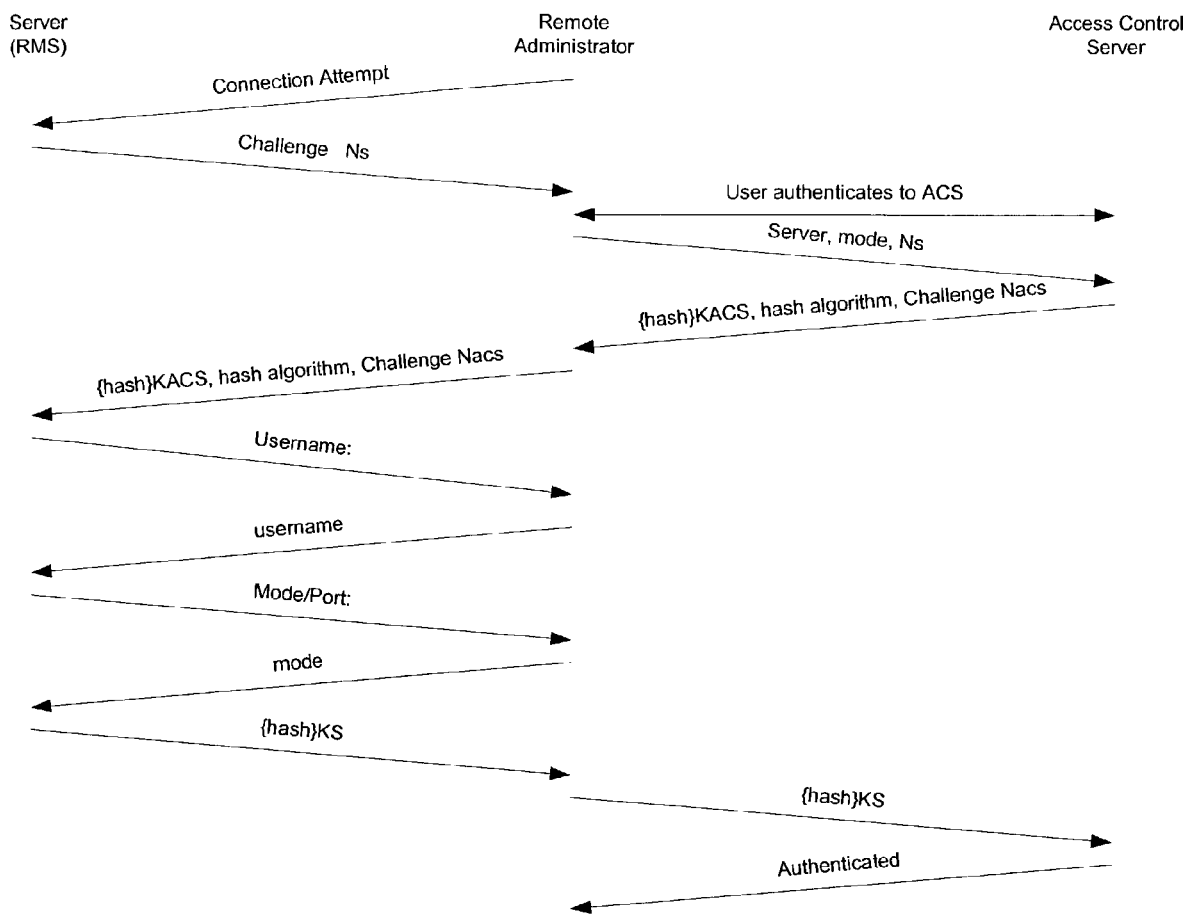
FIG. 10 shows sample flows for an additional exemplary embodiment of Isolated Challenge Mode Authentication.

A preferred exemplary embodiment of ICM can also include a provision for facilitating easier authentication for a user using cut and paste to transfer challenges and responses on their workstation. In this case it is important to limit the length of information transferred by the remote administrator. FIG. 10 illustrates a method for doing this. When the remote administrator attempts to connect to the RMS the RMS still responds with challenge Ns and the remote administrator still needs to be authenticated by the ACS by whatever means the security policy for the network requires. The remote administrator then communicates that it wants to authenticate using the ICM short form of authentication and provides the name of the RMS, the mode/port it wants to be authenticated for, and the challenge Ns it received from the RMS.

The ACS server hashes the username, mode/port, and Ns using a selected hash algorithm. The ACS then encrypts the hash using private key KACS and sends the encrypted hash, the name of the hash algorithm, and a new challenge for the RMS, Nacs (if mutual authentication is required), to the remote administrator. The remote administrator can then cut and paste the message into their terminal emulator to send to the RMS.

The RMS will then prompt the remote administrator for their username, and the mode/port the want access to. After the remote administrator has provide this information the RMS will hash the username, mode/port, and Ns using the hash algorithm specified in the message from the ACS via the remote administrator. The RMS also decrypts the hash sent by the ACS using KACS and compares the two hashes. If the hashes match the information provided is authenticated.

If Nacs was provided then the ACS wants to authenticate the RMS. The RMS will use the hash algorithm used by the ACS to hash the server name and Nacs and will encrypt the hash with the RMS private key KS and send the result to the remote administrator. The remote administrator will send the encrypted hash to the ACS. The ACS will decrypt the hash with key Ks and compare the hash to its own hash of server name and Nacs. If they match the ACS sends a message to the remote administrator that the RMS is authenticated.

As indicated above, the ICM authentication and authorization and be used in environments other than a remote administrator connecting to an RMS. Anytime a user or device that has access to an ACS is attempting to connect to another device ICM can be used. If the device being connected does not have connectivity to an ACS then ICM will allow the device to use a centralized database to authenticate the connecting device (and to authenticate the device being connected to).

An example of when this might be useful would include a Cisco router that is configured to use TACACS+ as its first choice for authentication. A typical second choice when TACACS+ is not available might be to use the enable or secret password. However, in a large organization, the enable password might not be very secure. With ICM, the second choice could be ICM using the same centralized user database that TACACS+ uses for authentication.

Another example of when ICM could be useful would be for backup links in an outage situation. If there are a number of ISDN links from a customers central hub to remote sites and the primary connectivity is for instance frame relay and the central hubs frame relay access circuit goes down. The central hub might not have enough ISDN circuits to restore all the connections to remote sites and the central hub will want to make a decision on which remote sites to bring up ISDN backup links to. The central hub will be initiating connections to remote sites that are quite possibly isolated from an ACS. ICM would allow the remote isolated device to authenticate that the central hub is indeed the central hub.

When using cryptography, key distribution is always a consideration. An RMS will need to be configured with its private key Ks. It will also need to be configured with the public keys KACS of any ACS private key that can be used for authentication and authorization of users. If a new ACS is added with a new private key KACS or an old key is compromised or not longer valid, the list of public keys on the RMS needs to be updated. Also, if the RMS private key becomes compromised it will need to be changed. In this preferred exemplary embodiment the privilege of changing and maintaining the public and private keys is reserved for the Network Security Administrator role. The RMS can be configured to not allow the ACS servers to authenticate the Network Security Administrator role, but rather to maintain a separate public key Kns for authenticating a Network Security Administrator. This way the compromise of an ACS private key will not allow an intruder to change the keys on an RMS. Only a Network Security Administrator can do that. If, however, the Network Security Administrator private key becomes compromised and an intruder changes the keys on an RMS before the compromised keys can be changed, physical access to the RMS will be required to restore the RMS.

After a user is authenticated, they can be authorized for specific resources on the RMS. These resources can include the different ports of the RMS, the different roles of a user on the RMS such as RMS operator, RMS Network Administrator, or RMS Network Security Administrator, or for different functions of the RMS such as power cycling a device. Each user can be authorized or not for the individual ports, roles, or functions.

After a user is authenticated to the RMS, the RMS will go into an initial mode of operation. Some of the modes of operation would include connecting the user to a port in a pass through mode of operation where the data link connection is between the authenticated user and the device on the other end of the port, connecting the user to a port in a secure mode where the RMS terminates the DLC from the user on the RMS and performs encryption between the user and the RMS and then passes the data to the port unencrypted, or one of the administrative modes on the RMS itself such as Network Operator, Network Administrator, or Network Security Operator.

The RMS will operate in a different role for the different modes of operation. The different roles the RMS can function in are illustrated in FIGS. 11 through 14.

Figure 11:
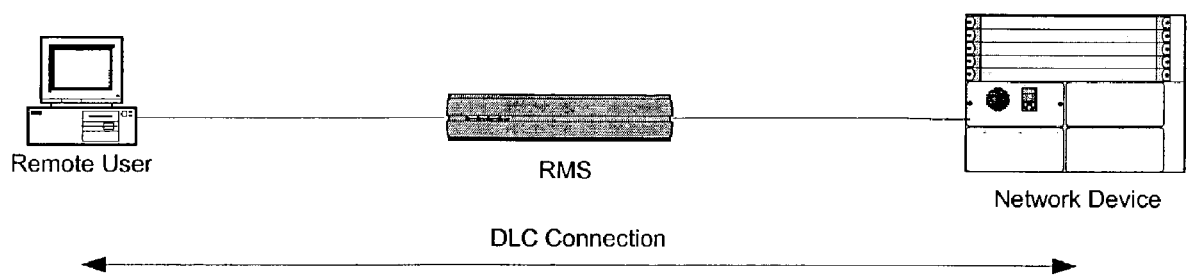
FIG. 11 shows the RMS in pass through mode.

FIG. 11 illustrates the RMS operating in pass through mode. In this mode of operation, the RMS is operating at the physical layer. The signals from/to the PSTN network are demodulated/modulated and the Data Link Control (DLC) layer connection is established between the remote user and the network device. The RMS can be configured to automatically be in this mode and not even challenge the remote user. In this case the RMS would be functioning as a traditional modem. The RMS could also be configured to enter this state after the user has been authenticated.

Figure 12:
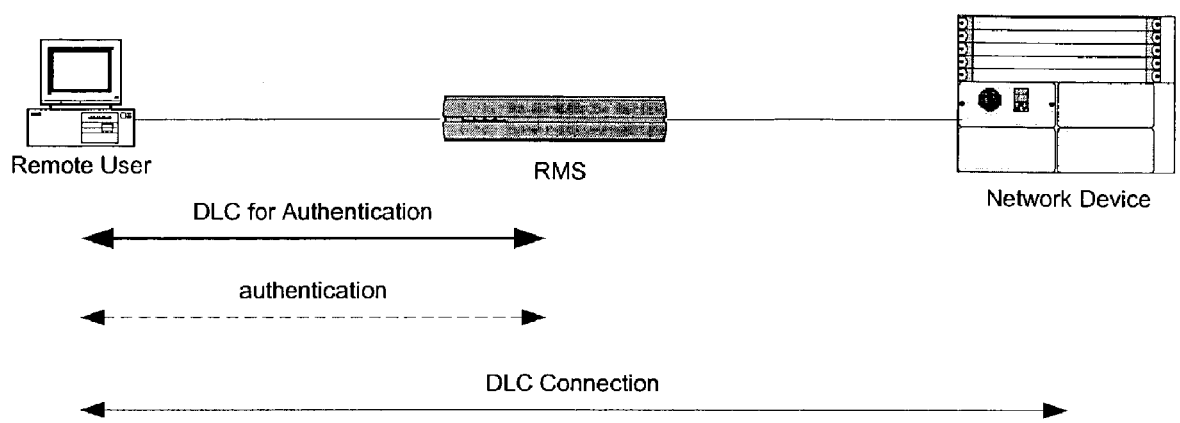
FIG. 12 shows the RMS in authenticated pass through mode.

FIG. 12 illustrates the RMS operating in verified pass through mode. In this mode the remote user establishes an initial connection to the RMS itself. The RMS authenticates the remote user and optionally authenticates itself to the remote user. Once authentication is complete the RMS no longer participates in DLC level functions and reverts back to being a link level device.

Figure 13:
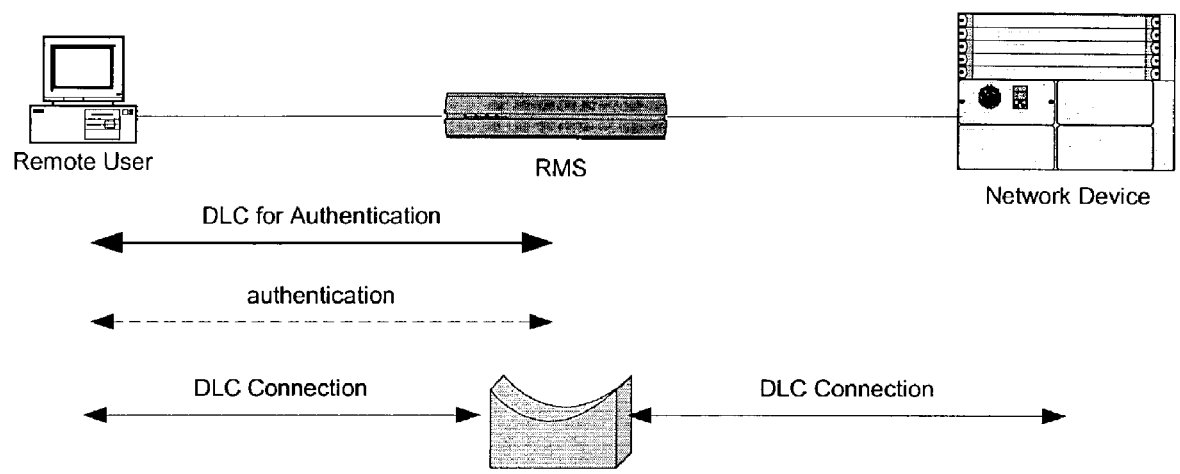
FIG. 13 shows the RMS acting as a logical bridge for the connection from the remote user to the network device.
Figure 14:
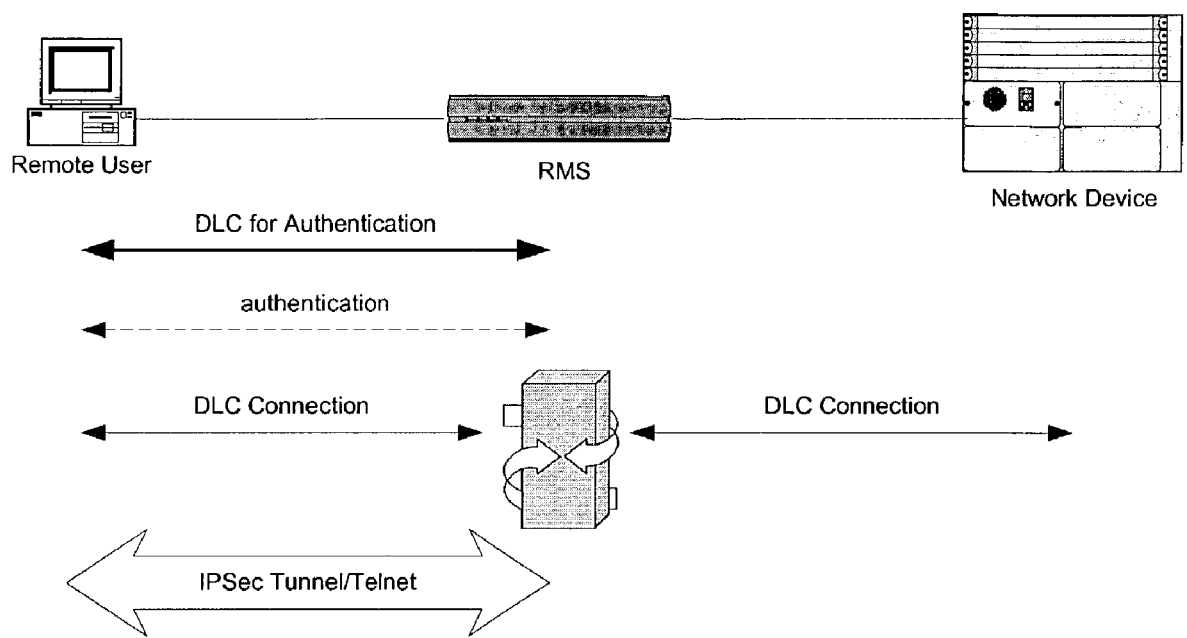
FIG. 14 shows the RMS acting as an application gateway with a secure network level connection from the remote user to the RMS.

There are time when it is advantageous to have the RMS continue to terminate the DLC to the remote user and act as a bridge to the network device. This is illustrated in FIG. 13. For instance, if the RMS is being used to manage multiple devices and the remote user is to be able to jump between the devices using control characters to exit a connection to a device, the RMS would act as a bridge at the DLC level.

If the traffic between the remote user and the network device were going to be encapsulated in a layer 3 protocol such as IP then the RMS would function as a router. However, in a preferred exemplary embodiment a protocol such as Internet Protocol Security (IPSec) would be encrypting the user traffic between the remote user and the RMS at layer 3 and an application such as Telnet would be running between the remote user and the RMS over the IPSec tunnel. The RMS would then be acting as an application level gateway to deliver the user traffic to/from the network device in clear text using an application such as a terminal emulator. This is illustrated in FIG. 15.

Figure 15:
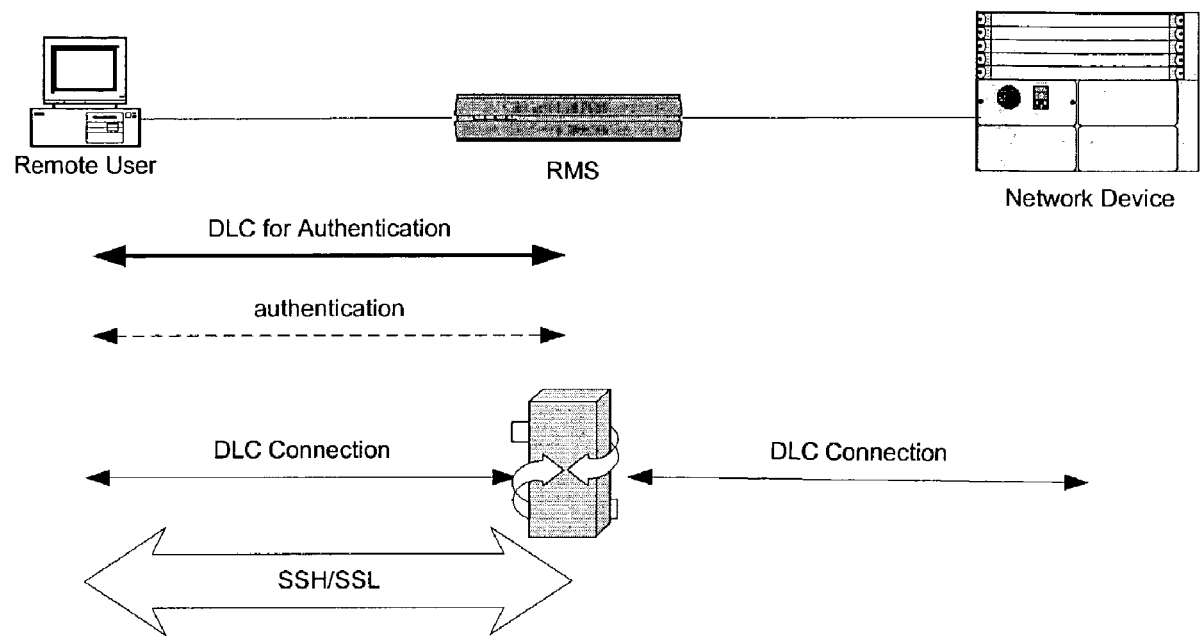
FIG. 15 shows the RMS acting as an application gateway with a secure application level connection from the remote user to the RMS.
Figure 16:
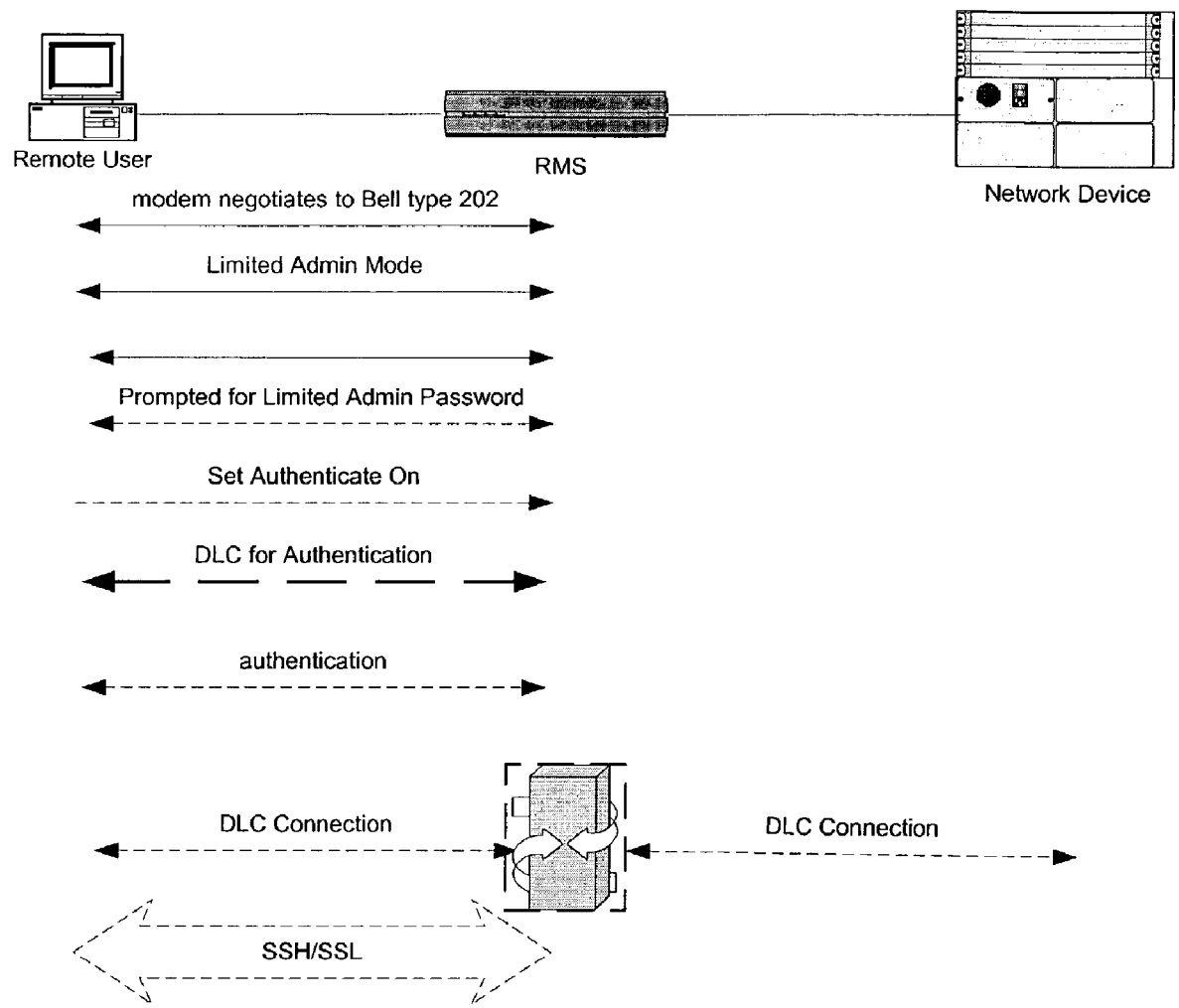
FIG. 16 illustrates using modem parameter negotiation to modify the operating mode of the RMS
Figure 17:
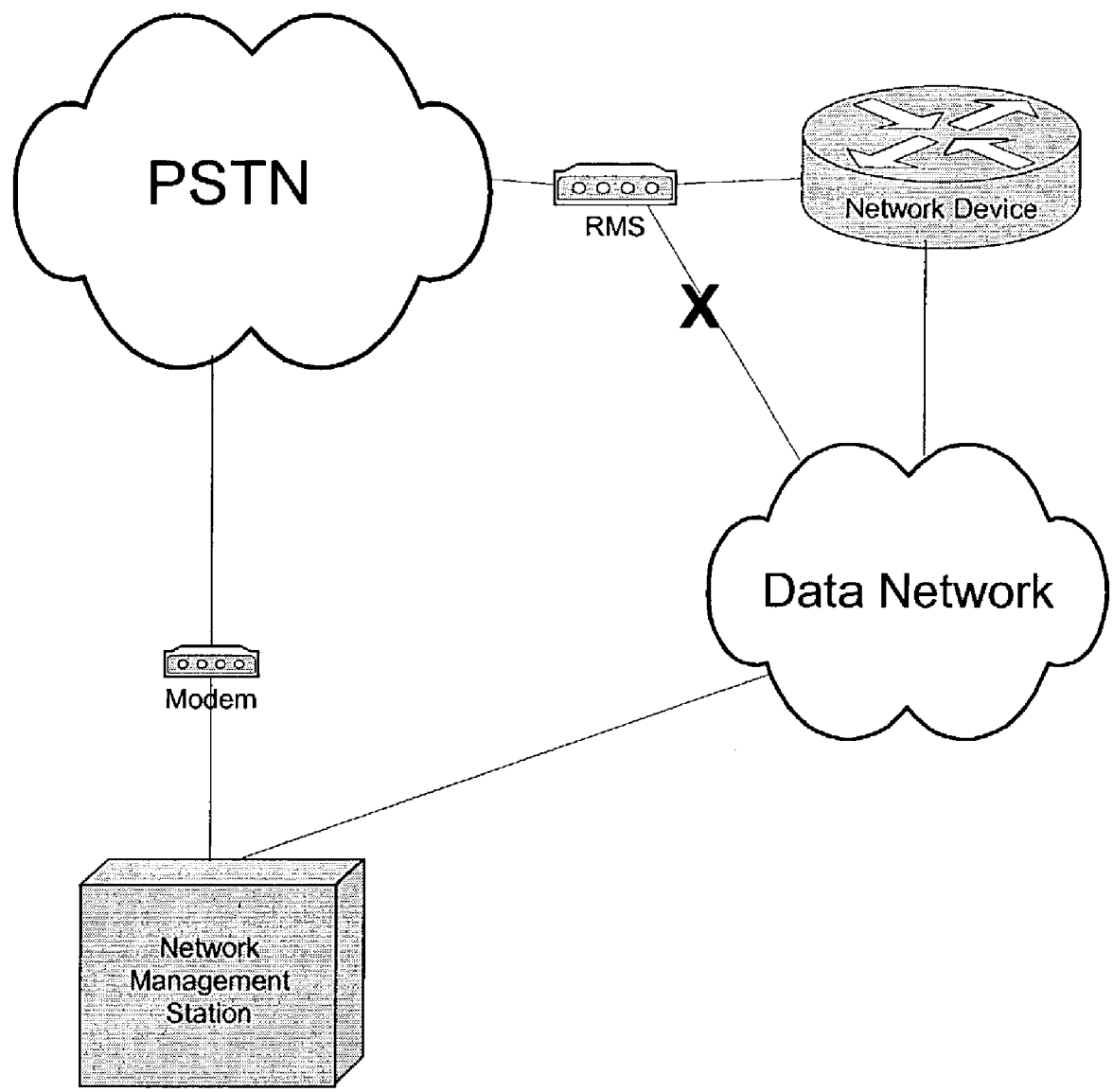
FIG. 17 illustrates the RMS connecting directly to a network management station over the PSTN to report network status information.
Figure 18:
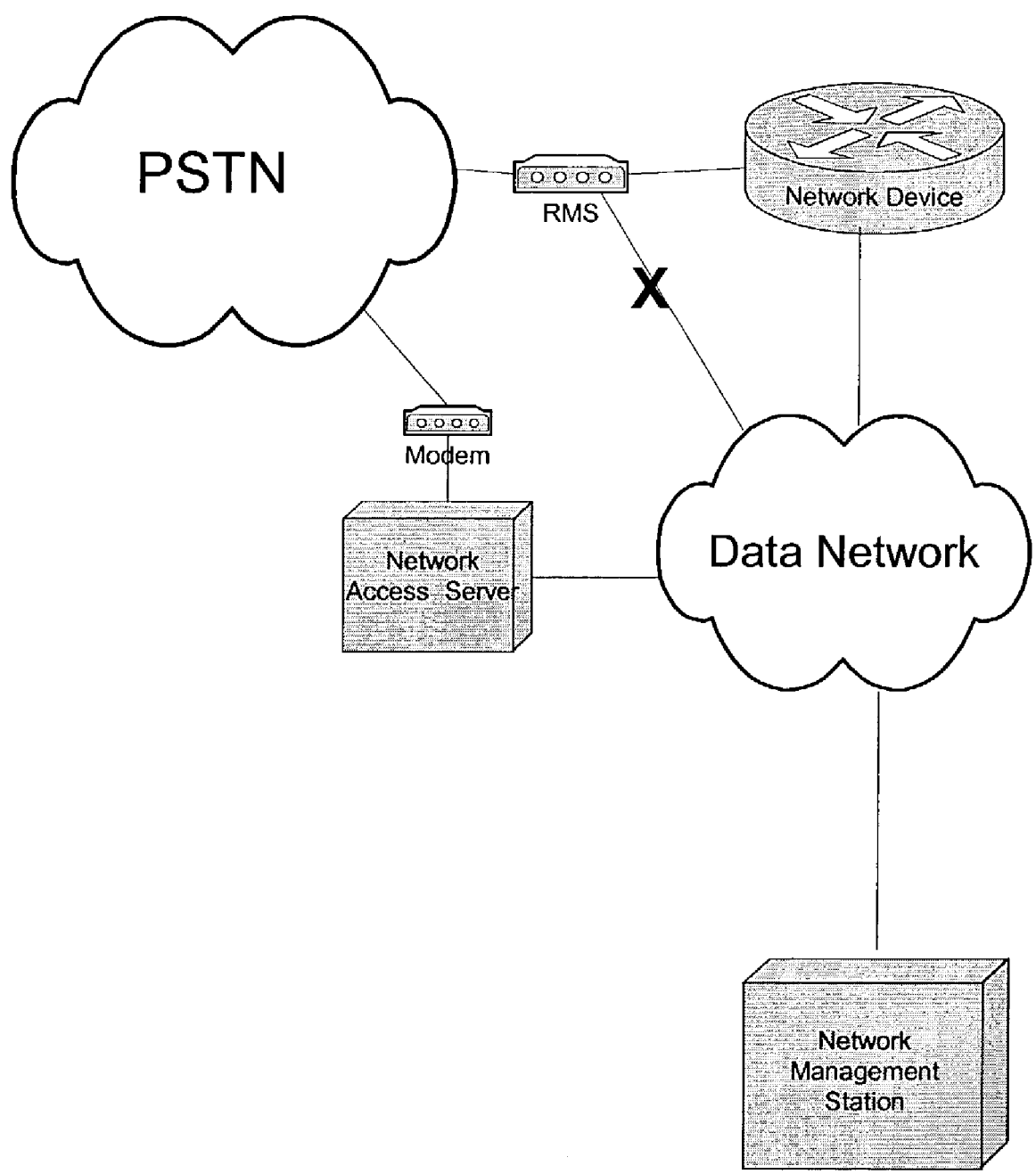
FIG. 18 illustrates the RMS connecting over the PSTN to a NAS to establish connectivity to a Network Management Station.
Figure 19:
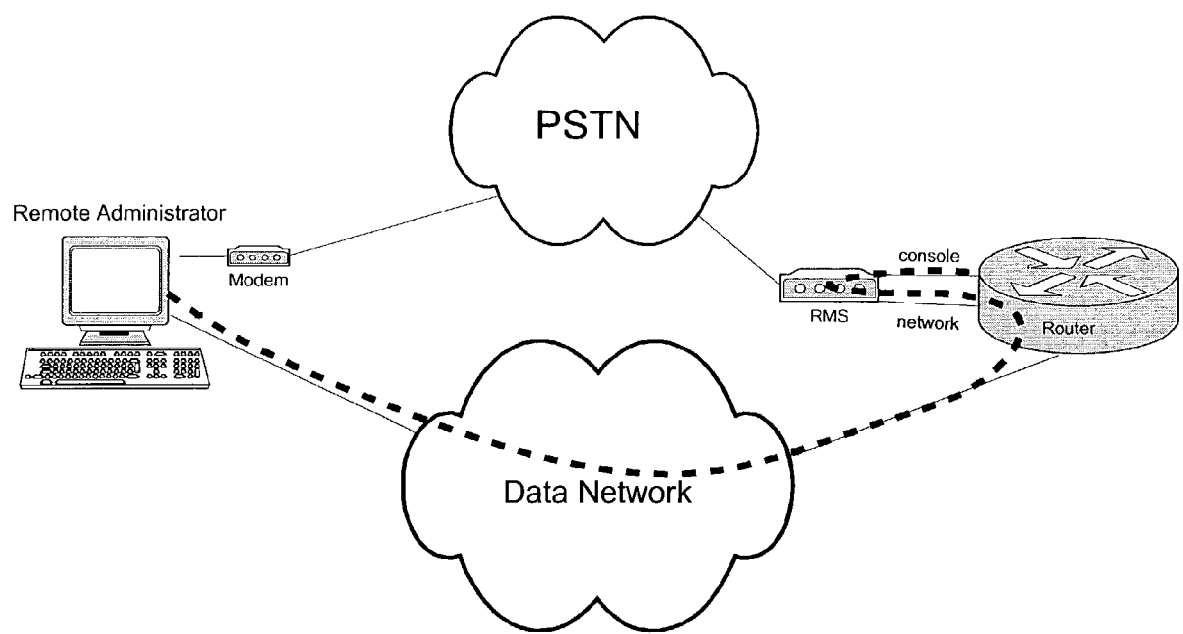
FIG. 19 illustrates a remote administrator connecting to a router console port over the in-band network.
Figure 20:
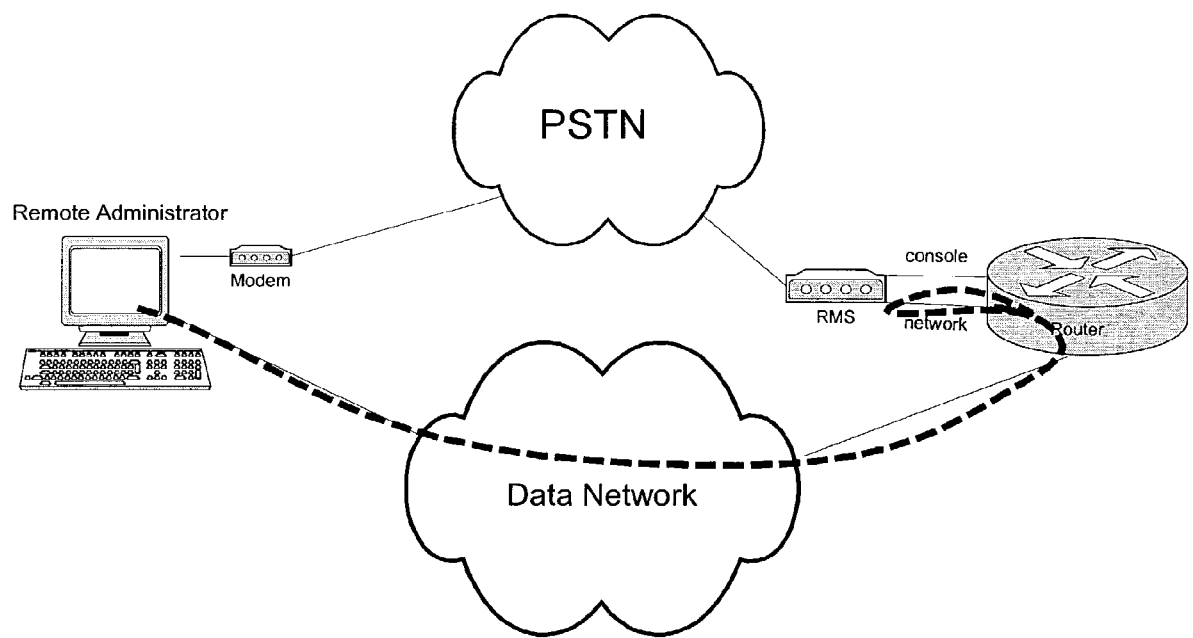
FIG. 20 illustrates a remote administrator connecting to a virtual terminal port on a router through the RMS.
Figure 21:
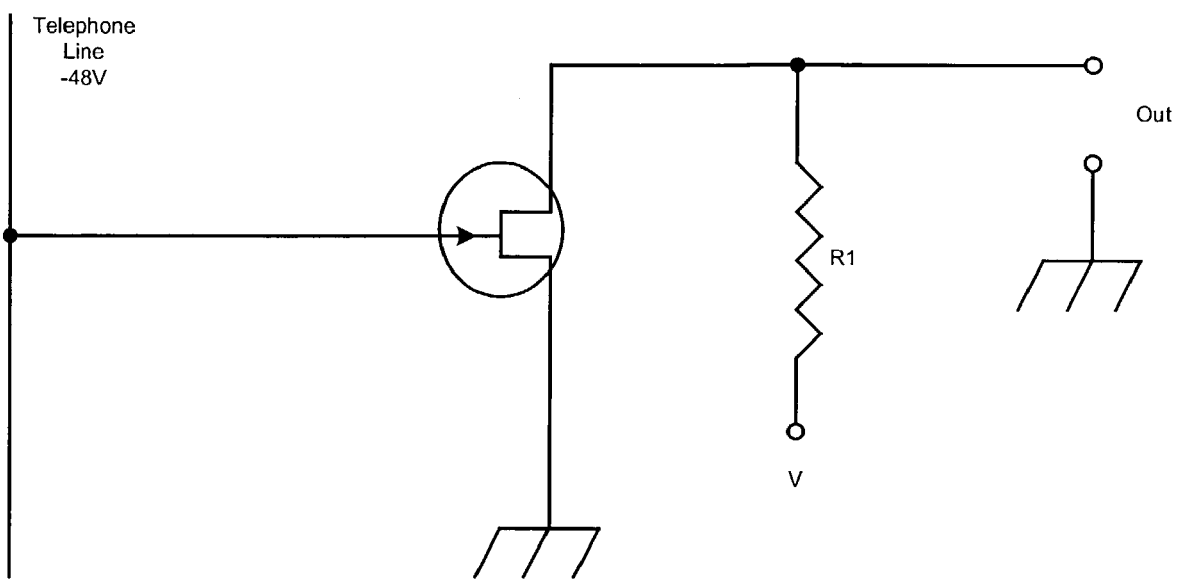
FIG. 21 illustrates a sample circuit for monitoring the voltage on a telephone line.
Figure 22:
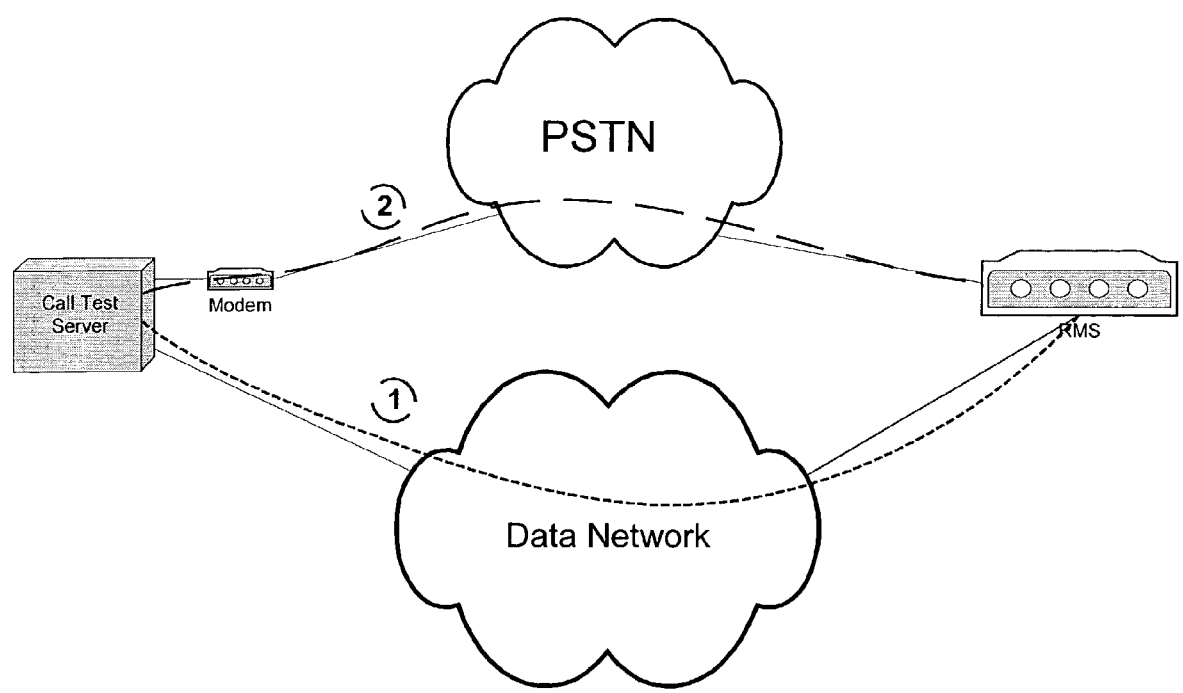
FIG. 22 illustrates the path of the call test setup (1) and the call test (2) for call testing.
Figure 23:
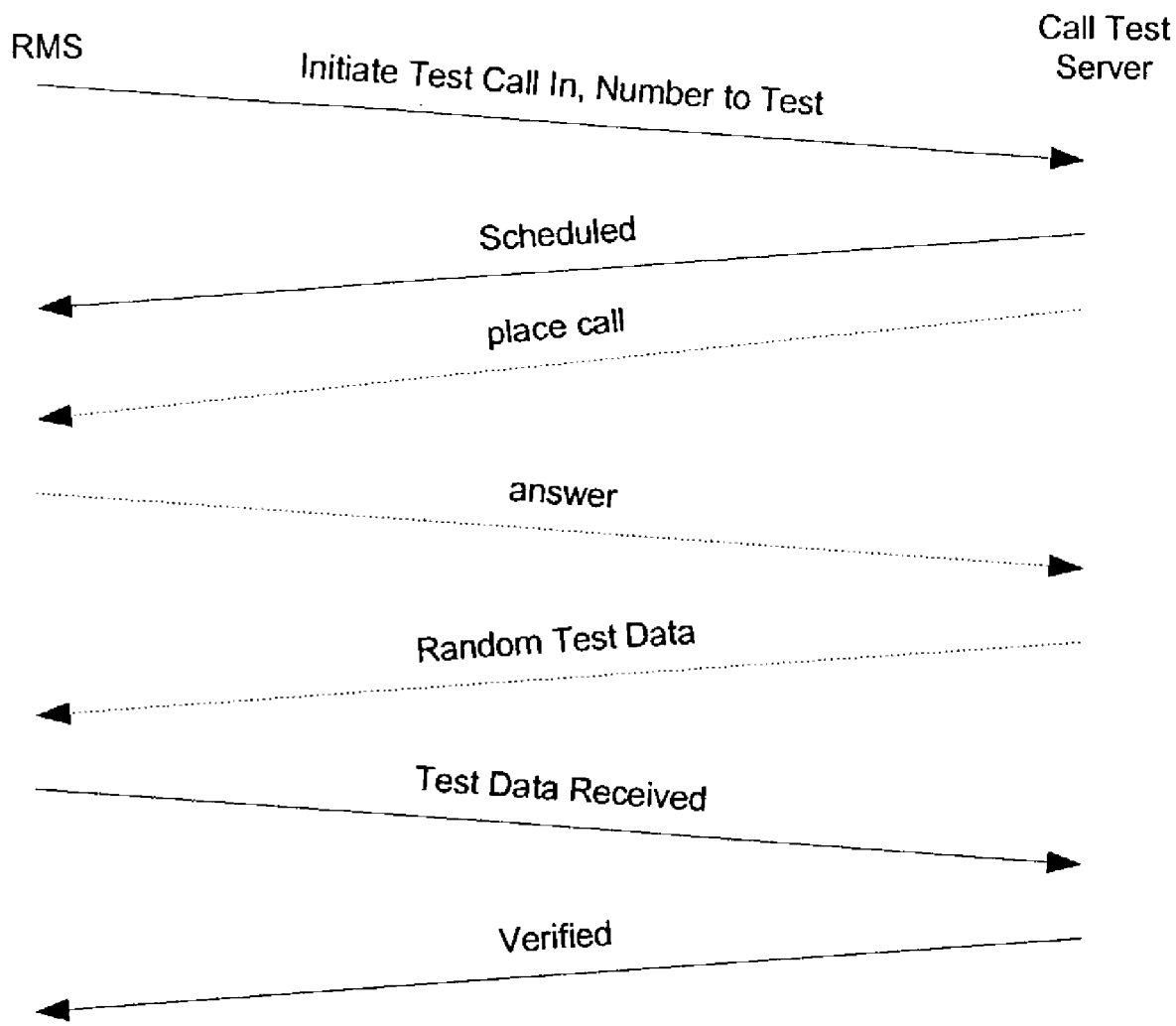
FIG. 23 illustrates the RMS initiating a test of receiving a call.
Figure 24:
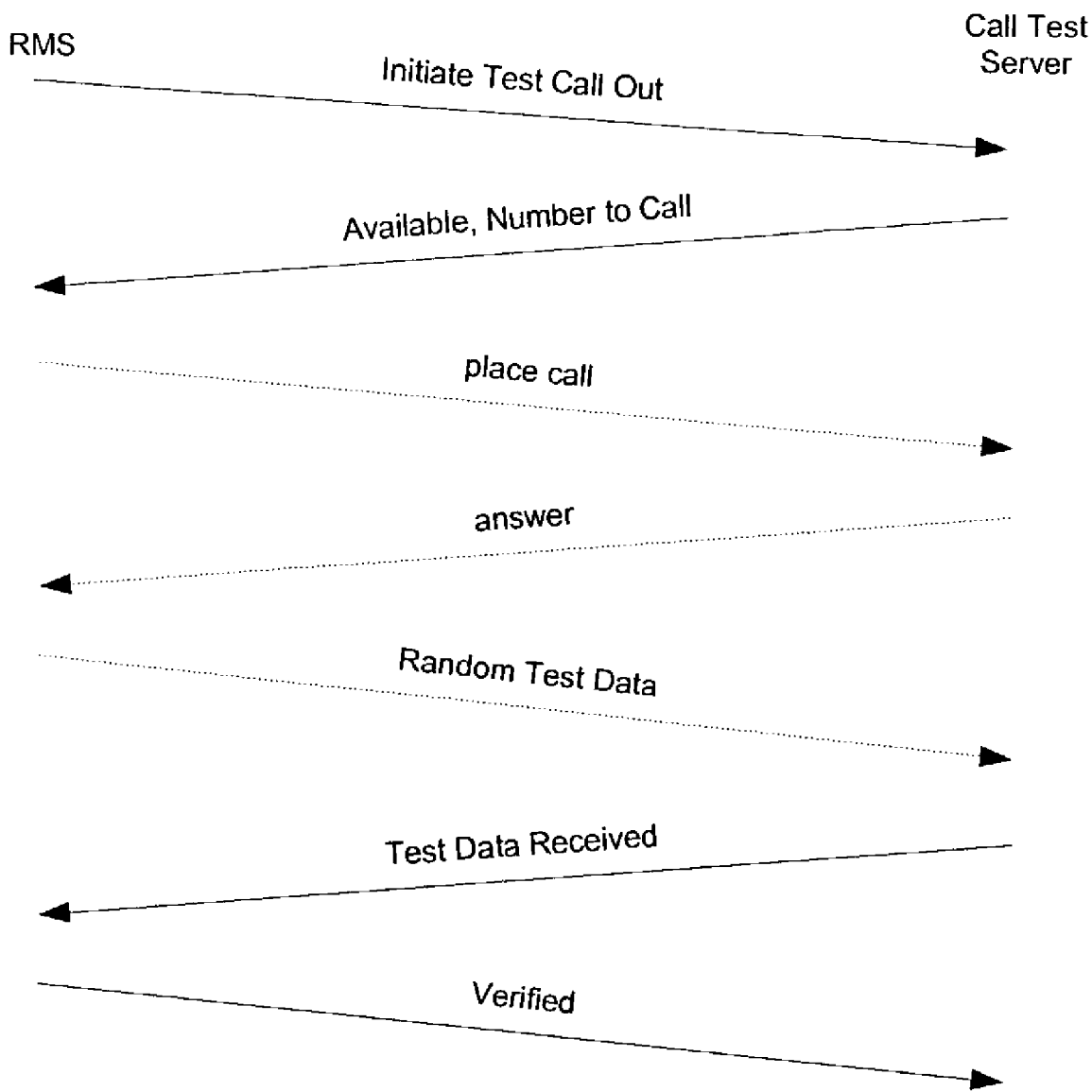
FIG. 24 illustrates the RMS initiating a test of placing a call.
Figure 25:
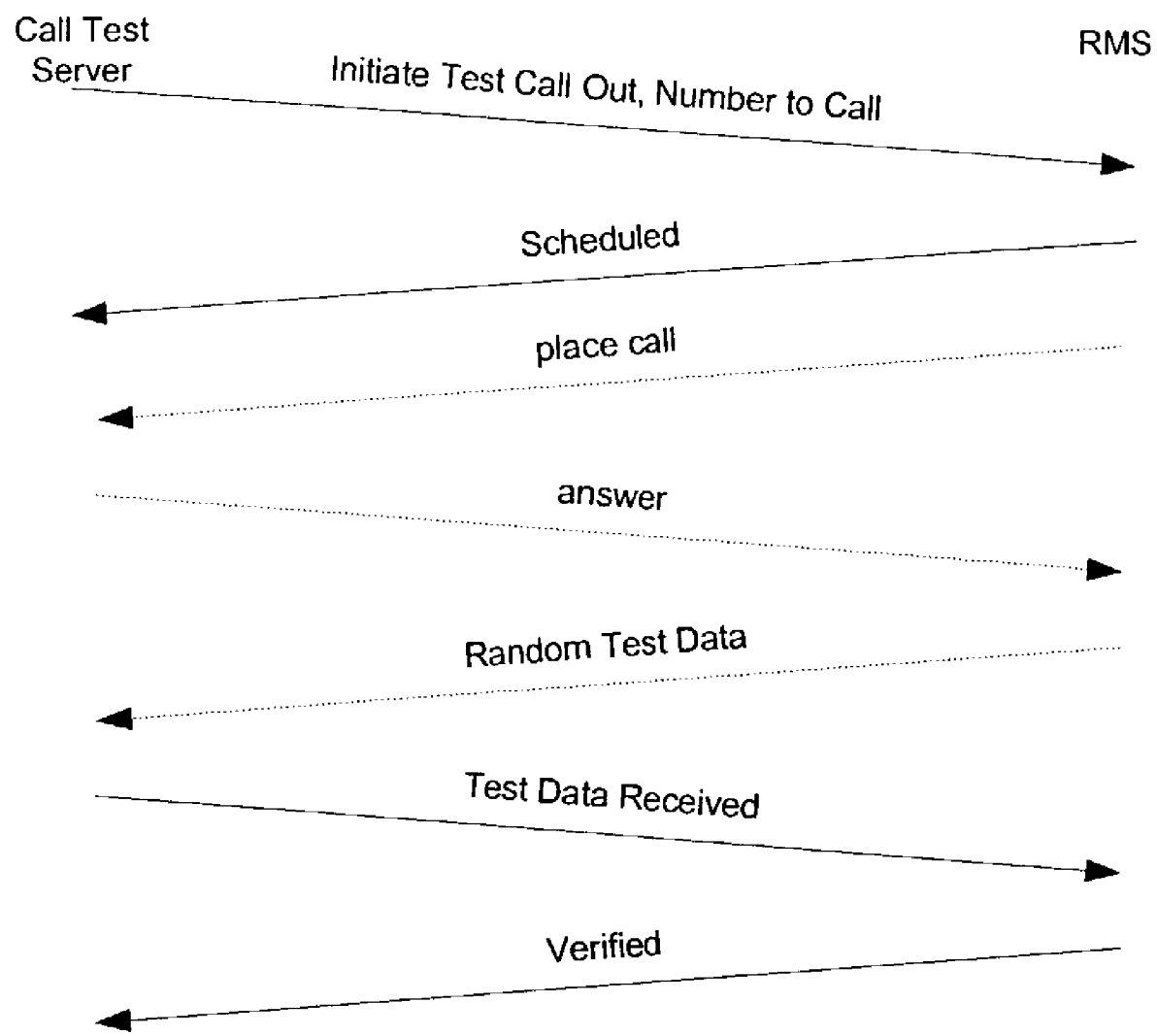
FIG. 25 illustrates the Call Test Server initiating a test of the RMS placing a call.
Figure 26:
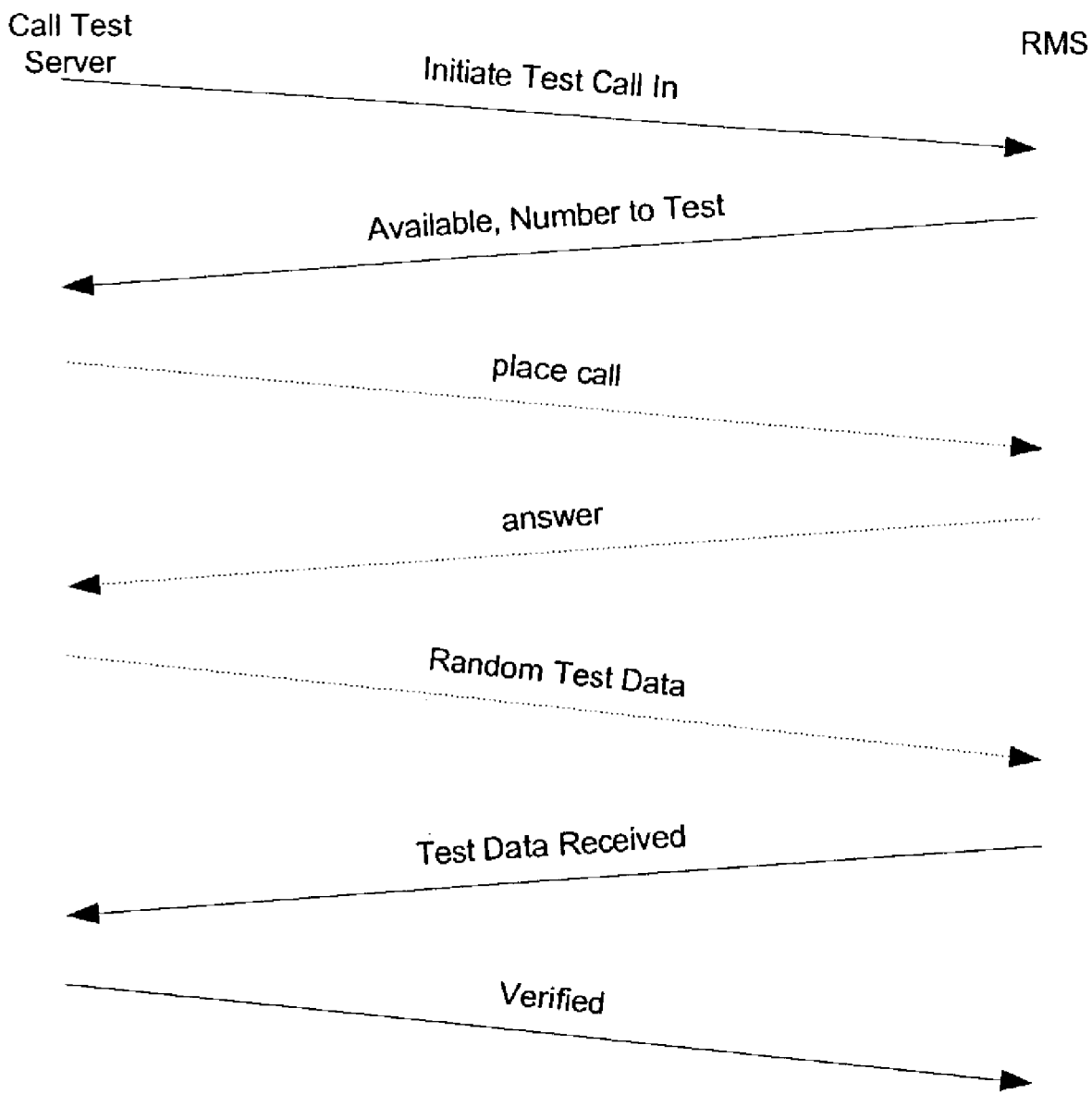
FIG. 26 illustrates the Call Test Server initiating a test of the RMS receiving a call.
Figure 27:
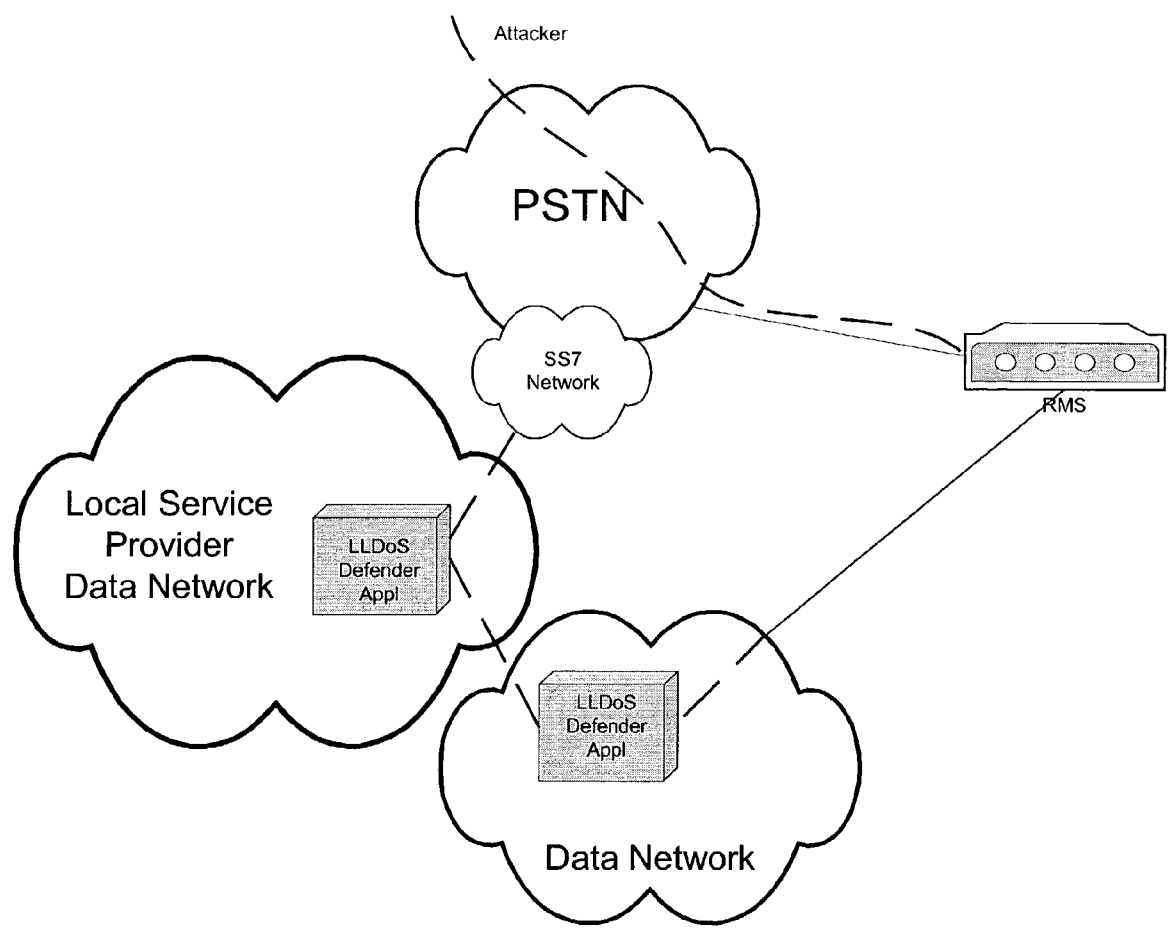
FIG. 27 illustrates the RMS connectivity to an application to allow dynamic blocking of calls to the RMS over the PSTN.
Figure 28:
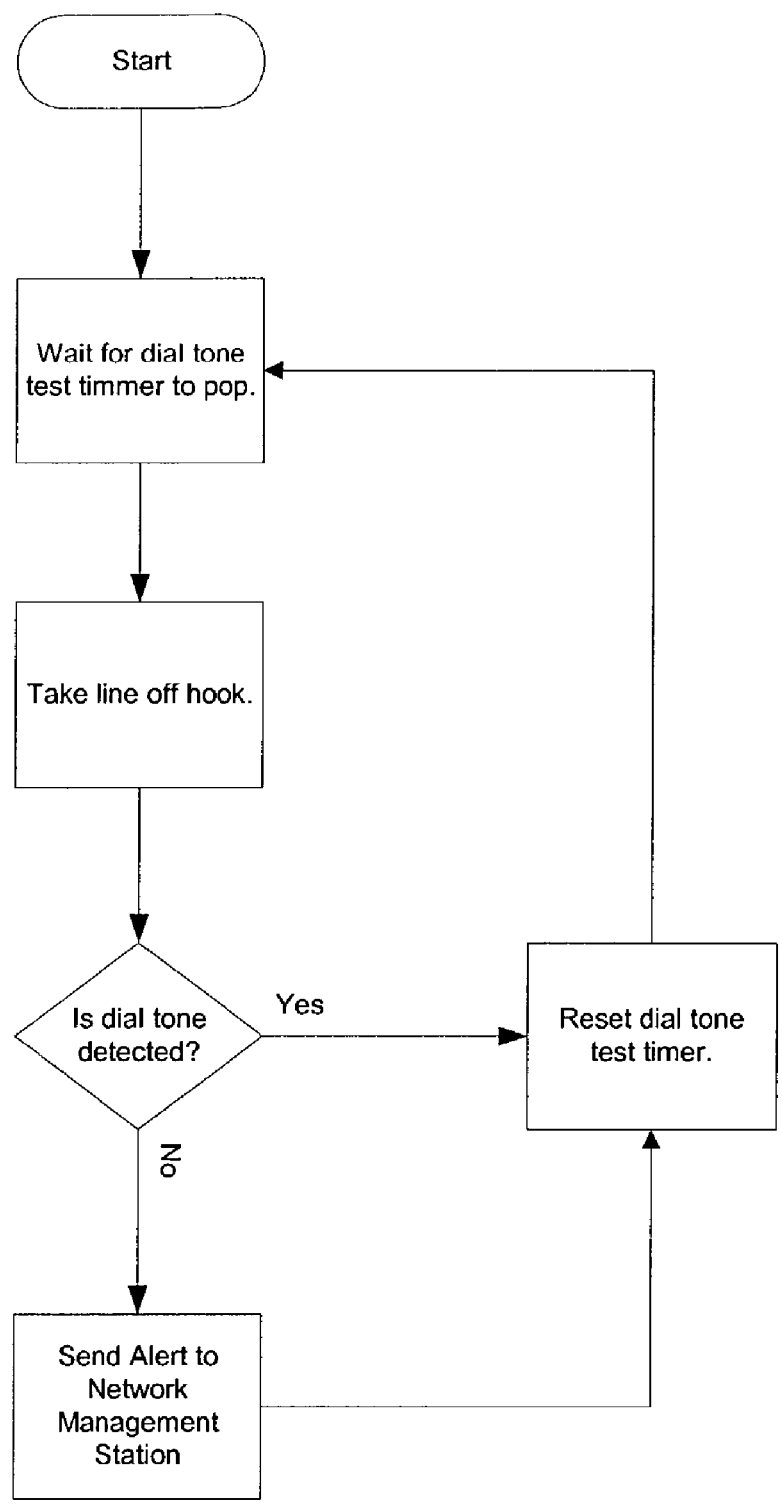
FIG. 28 shows a flowchart of the dial tone testing of a telephone line.

FIG. 15 illustrates another application level gateway embodiment. In this embodiment, a TCP/IP connection is established between the remote user and the RMS and then an application such as Secure Shell (SSH) is run between the user and the RMS. In this embodiment the encryption of the user traffic between the remote user and the RMS is performed by the secure shell application. The RMS would deliver the traffic in clear text to/from the network device using an application such as a terminal server.

When the RMS is configured to operate in pass through mode without user authentication, the user dialing in over the PSTN connection is not given the opportunity to elect to connect to the RMS for administrative purposes rather than connecting to the network device port. In general, this would not be a problem because the network administrator could use the in-band connection of the RMS to connect to the RMS for administration of the RMS. However, if the in-band connection were down, not connected, or not implemented on the RMS, this would not be an option. In order to allow the RMS to remotely be changed from pass through mode to an administrative mode, one of the modem negotiation settings is reserved for a limited administrative mode. For instance, if the modem type negotiated to a 1200-baud Bell type 202 modem, then the RMS would enter the limited administration mode. The main feature of the limited administration mode is that it allows a remote user to set the RMS out of pass through mode so that they can then enter an authentication mode.

To recover the RMS from pass through mode over the PSTN line the remote user would configure their modem to use the configured modem type reserved for Limited Admin operation. This would cause the modems to negotiate to this setting. The RMS would come up in Limited Admin mode and would request the remote user to enter a password. This password will travel over the PSTN in the clear so should be changed after Limited Admin Mode has been used. The remote user will enter the password and will then have access to the Limited Admin command set. The command set will include the command to set the RMS to authentication mod (SET AUTHENTICATE). Other command may also be included in the Limited Admin command set.

Once the SET AUTHENTICATE command has been executed, the RMS will begin normal authentication. The remote user can continue to establish a session over this connection or they can hang up and call back to establish a new connection with renegotiated modem settings. The RMS remains in authentication mode until it is explicitly reconfigured for pass through mode.

In general, forcing the modem parameter negotiations to pre-selected values can be used to select different modes of operation. The above example was when the RMS was set to pass through mode and the modem negotiation was used to force the RMS to a limited administration state. The same method could be used if the RMS was configured to automatically connect to an application on the RMS such as a web application. The modem parameter negotiations could be used to change the connection to a terminal emulation session or again to a limited administration mode.

In general, the RMS will typically report ongoing network status information and alerts to a network management station using a protocol such as SNMP by the in-band network connection. However, there are times when the RMS will report network status information and alerts over the out-of-band connection such as the PSTN. Typically, this would occur when the RMS has lost connectivity to the Network Management Station via the in-band connection. One primary condition the RMS might want to report in this manner would be the failure of the RMS in-band connection. Another event might be the loss of power to the site since the in-band connection could well be down due to the loss of power. To send the alert via the out-of-band connection, the RMS would initiate a connection over the out-of-band network to either the Network Management Station or to a NAS for the in-band network. Once this connection is established, the RMS can send the alerts or status information to the Network Management Station over the out-of-band connection.

As indicated above, one of the events that it might make sense to report over the out-of-band connection would be the loss of power at the site. The RMS can be configured to report the loss of its main external power supply. Upon detecting loss of power from the main power supply, the RMS would be configured to dial a specific Network Management Station to report the outage. This could be the same or a different Network Management Station the RMS uses for reporting other information. This would provide a Network Management Center quick notification that the underlying cause of a network problem is a power outage at the remote location. This can save significant time during the problem determination process and help get the proper personal involved more quickly.

The most straightforward way to provide the RMS with power for reporting the power outage would be to build a small uninterrupted power supply (UPS) into the RMS. This UPS would provide the RMS with limited time to establish a connection to the Network Management Station over the out-of-band connection, report the outage, and possibly report any log information stored on the RMS before taking down the connection. The RMS would then be available for connections from Remote Administrators via the out-of-band connection for further problem determination as long as the power in the UPS lasted.

Another exemplary embodiment for providing power for reporting the power outage at the site is to use line powered equipment. There are a number of line-powered modems on the market today. A relay held open by the power from the main external power supply would close when the power fails, connecting the line-powered equipment to the telephone line and the power supply associated with the telephone line. The line-powered circuitry would be configured to establish a connection with a Network Management Station and report the power loss. Using a line-powered modem would eliminate the need for a UPS and would not limit the length of time a connection could be established to the Network Management Station or a Remote Administrator. However, the functionality of the line-powered equipment might be limited and there would be the expense of the line-powered circuitry instead of the cost of the UPS.

The RMS can also be configured to provide notification to the Network Management Station when power is restored to the site. When power is restored the RMS can be configured to wait a determined length of time (perhaps on the order of minutes) to give the network device time to boot and the in-band connection time to reestablish. At the end of that time the RMS will check the in-band connection. If the in-band connection is up and the RMS has connectivity to the Network Management Station via the in-band connection, the RMS will send the notification of power restoration to the Network Management Station via the in-band connection. If the in-band connection is not up or the RMS cannot reach the Network Management Station via the in-band connection, then the RMS will establish a connection over the out-of-band connection to report the power restoration.

The RMS can be configured to monitor the connection to the network device console port. Monitoring the electrical characteristics of the connection can allow for the detection of a cable being disconnected. Even with the use of a modem eliminator such as is commonly used when the connection to the console port of a network device than may be configured as a DCE and the port on the RMS is also configured to be a DCE, the electrical characteristics of certain pins can be monitored to assure the network device is connected. For instance, if a 9 pin D-shell connection is used for an RS-232 connection, the DTR signal (pin 4) could be monitored for voltage. Even with a modem eliminator, the remote device should be applying to the DTR signal pin of the RMS. If no voltage is being applied to this pin, the RMS can be configured to send an alert.

The RMS can be configured to monitor the traffic to and from the console of the attached network device since it is always connected to the port. This allows for ongoing monitoring and/or logging of events involving the console. Commands a remote user sends to the console can be logged and the response to those commands can be logged. In addition to monitoring commands from a remote administrator to a console and the results returned, the RMS can monitor messages sent to the console while no remote administrator is logged on.

The RMS can filter the messages sent to the console and generate an alert or trap when certain messages are returned. For instance if the RMS detects messages associated with the boot process of a device, the RMS can generate an alert that the device just reloaded. If the RMS sees a console message indicating a particular interface has gone down on a device, the RMS can generate an alert. This could be useful if the interface that went down was the interface the device would normally use to send network management traffic over.

Based on the authorization level afforded to the remote administrator, the RMS could also filter what commands the remote administrator is allowed to issue to the network device. For instance, some administrators might be precluded from entering the ENABLE mode on a Cisco router. Having this ability to filter commands could be useful if the authentication and authorization methods on the RMS are stronger than the authentication and authorization methods on the device.

Another advantage of the RMS is that an RMS administrator can set up macro commands on the RMS. The administrator can also configure the RMS to execute some commands at the beginning of a connection of a remote administrator to a network device console port and/or at the end of a connection to a network device console port. This can be used to plug a major hole in the security of allowing remote connectivity to the console port of a Cisco router or switch. Since the console port of the device can not tell when a connection drops, if a connection does drop and a new user connects in, the new user will have the authority and privileges of the prior user without having logged in. However, the RMS does know when the connection dropped and can execute a macro to log the user out before another user can connect in. General macros that a remote administrate could execute could also be configured.

A remote administrator can also use the in-band data network to connect to the console port of a network device attached to an RMS. By using a network based application such as Telnet, or SSH, or HTTP, the remote administrator can connect to the RMS and the RMS can then connect them to the console port of the router. By using a secure application such as SSH or HTTPS or by using secure paths through the network such as IPSec tunnels, the communications between the remote administrator and the RMS can be secure. Then the only place the traffic would pass in the clear would be between the RMS and the console. Since the RMS and the network device should be collocated, the portion of the traffic path that was the most vulnerable has just been secured. Allowing in-band connections like this can save on toll calls, and can also allow a remote administrator connect at higher speeds and they can have connections to multiple systems without having multiple modems.

It is also possible for a remote administrator to connect to the RMS through the in-band data network and then through the RMS connect to the network device again through the RMS in-band connection to the data network to a virtual terminal (VTY) port on the network device. The connection from the remote administrator to the RMS can be secure and then a protocol such as Telnet can be used to connect from the RMS to the network device. This allows for the majority of the network path to be secure. The only portion of the traffic path that would be insecure should be a LAN segment between the RMS and the network device. If the RMS in-band connection were a back-to-back cable to a port on the network device, then the only portion of the traffic path that would be insecure would be the cable. This allows for more secure connections to the VTY ports on a network device. Since many network devices do not support secure logins like SSH the RMS can provide the needed security. VTY ports can allow more than one user to be logged into the device at the same time while only one user can be logged into the console port at a time.

The RMS can also monitor the physical connectivity of a telephone line to the RMS and send an alert if the telephone line is disconnected. Often the RMS is in place to assist with problem determination and resolution when there is an outage in the network. It might be that the telephone connection to the RMS does not get used very often. It is not unheard of for a telephone line to a modem on a console port to have gone for weeks and months without working and no one noticing. When it is needed, such as when there is an outage, it is important to know that the telephone connection will be there and working. Monitoring the connection to the line assists in doing this.

When a telephone line is in the on-hook state, the line generally carries a voltage. In the United States, this is in the vicinity of −48V. To monitor a line that is in the on-hook state, it is important to draw very little current if any at all. A FET transistor circuit would be a good candidate for this circuit. A connection from the telephone line would be connected to the gate of the FET transistor. While a high enough negative voltage was maintained on the line, the FET would be in pinch off state and no current would flow between the source and the drain. If the negative voltage was removed from the line and the voltage at the gate went to zero, the FET would allow current to begin flowing between the source and the drain on the transistor. The circuit could detect the flowing current or the circuit could be designed so that the current flow caused a voltage drop at the output to the circuit. This voltage drop could be noted and used to trigger an alert that the line has been disconnected while at the same time drawing very little if any current in the steady state condition. This circuit would provide the most accurate indication of the status of the connectivity of the telephone line when the modem portion of the RMS is in the on hook state.

In situations where it is desirable not to physically monitor the voltage on the telephone line a method for periodically monitoring the status of the telephone line is possible. The RMS can be configured to periodically go off-hook and dial a telephone number to test for line status. If no telephone number is provided to dial the RMS can go off-hook and monitor for dial tone. If dial tone is returned the RMS will consider the line still connected. While this will not provide for continuous monitoring of the connectivity, it will still detect the line being disconnected in a timely manner. If the telephone line is currently in use for a connection the RMS will consider the line connected and will not need to do the test. The frequency at which this test is performed can be configured.

The RMS also provides for additional testing of the ability to send and receive calls over the out-of-band network. A portion of a distributed Call Test application resides on the RMS to assist with call testing. Another portion of the Call Test application resides on a Call Test Server in the Data Network. The Call Test Server also has connectivity to the out-of-band network. The RMS can be configured to periodically test its ability to send and/or receive calls, or the Call Test Server can be configured to periodically test the ability of the RMS to send and receive call. A test can also be explicitly started from either party.

When either side is beginning a test it establishes an application connection with the other party over the Data Network. For instance, if the RMS were initiating the test, it would initiate a connection to the Call Test Server. To test the ability of the RMS to receive calls, the RMS or the Call Test Server would send a Call Test In request over the data network connection and the other party would replay with an available if it is available for a test at that time. If it were not available, the other party would reply with a busy response. Either on the Call Test In request or the Available reply the RMS will indicate its number to the Server that the server is to call. If the Server has a database of RMS phone numbers it will verify that this number matches. The Server will then place a call to the RMS over the out-of-band connection. Since the RMS is expecting the call from the Call Test Server, it will connect the call to the Call Test application on the RMS. The Call Test Server will then transmit some random data to the RMS over the out-of-band connection. The RMS will then send this random data to the Call Test Server over the in-band connection. If the data matches, the Call Test Server will send a VERIFIED message to the RMS over the in-band connection to indicate the test was successful.

To test the ability of the RMS to place calls, after the in-band connection has been established, the RMS or the Call Test Server will send a Call-Test-Out request over the in-band connection. The other party will reply with an Available message if they are available for a test at that time. If they are not available at that time they will respond with a Busy message. On either the Call-Test-Out message or the Available message the Call Test Server will provide the RMS with the phone number to call for the test. The RMS will then place a test call to the Call Test Server over the out-of-band network. When the server answers, the RMS will transmit some random data over the out-of-band connection. The Call Test Server will then send the test data to the RMS over the in-band connection. If the data is the same then the RMS will transmit a Verified message to the Call Test Server over the in-band connection to indicate the test was successful. While it doesn't matter which side sends the random data, this exemplary embodiment has the side placing the call also sending the random data.

The RMS also provides a means to power cycle the network device. The network device can be connected to its power supply through the RMS. The RMS will have a relay inline between the power supply and the network device. When the remote administrator requests a device be power cycled the relay is opened disrupting the power supply to the device. The power is then restored to the device and the remote operator has connectivity to the device console to view boot messages and/or enter commands to perform password recovery remotely. In the event of a network device that has dual power supplies, a version of the RMS can have two power sources coming in and feed two supplies to the device. When an authorized remote operator requests the power to be cycles, the RMS will disrupt both power supplies simultaneously.

For the RMS to be as beneficial as possible it is important for the out-of-band connection to be available for legitimate traffic. This access could be taken away by an attack on the local loop connecting the RMS to the PSTN local service provider. If an unauthorized user dials in repeatedly, even though they do not get authorized, they are still tying up the local loop connecting the RMS to the out-of-band network. In fact large ISPs have come under attack by Distributed Denial of Service (DoS) attacks where illegitimate traffic ties up their modem pools so the legitimate users cannot get access to the ISP. I will refer to this as Local Loop DoS (LLDoS).

A first step in LLDoS protection is to monitor Caller ID and to note the Caller ID of connections that failed to authenticate. If a set number of failures from that number occur without any successful authentications from that number then the RMS will not longer attempt to authenticate calls from that number for a set length of time. Instead, the RMS will simply answer and immediately hang up on that number. The RMS can also be configured to reject calls that are marked a P or O for a set length of time when the RMS is under attack.

An alternative solution for LLDoS protection is for the RMS to have connectivity to an LLDoS Defender application in the Data Network. When the RMS has a call that fails to authenticate, it reports the calling number to the LLDoS defender application. Even if the calling number is not available, the RMS reports P and O calls that did not authenticate. If the RMS or the network appears to be under an LLDoS attack, the LLDoS Defender application talks with an LLDoS defender application in the Local Telephone Service Provider network to report a potential attack is taking place. The LLDoS Defender application in the Data Network provides the LLDoS Defender application in the Service Provider's network with a list of calling numbers it wants blocked from calling the RMS.

In addition, the defender application can indicate that it wants the Service provider to block the last call the RMS received even if the Caller ID was blocked so that the RMS does not know the number. The service provider still knows the number and can block the caller. When the defender application requests a Caller ID blocked call to be blocked, the defender application is given a reference number for that caller since the actual phone number cannot be released by the service provider. This way the defender application can unblock the caller by the reference number if it chooses to do so. The defender application can also request that all P and O calls be blocked.

In addition to providing a list of callers to block, the defender application can notify the service provider that an attack is taking place and request that the service provider begin collecting forensic data. This way additional data could be available to proper authorities is it is determined an attack took place and they need to investigate.

In the event that the RMS is not able to connect to the LLDoS Defender application through a Data Network connection, and the RMS comes under attack, the RMS can attempt to dial out between attack calls and call either the LLDoS Defender application directly of call a NAS to connect to the LLDoS Defender application and report the attack seems to be under way and provide a list of attacking numbers.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A management system for a computer data network, comprising:
    a remote network administrator connected to a data network through a plurality of separate, two-way means for connecting the administrator to the data network;
    wherein a first means for connecting comprises an analog communication system and an analog connection means, and a second means for connecting comprises a digital communication system and at least one digital communication means;
    wherein the analog communication system comprises (a) a remote management station comprising an embedded processor, and (b) a direct connection to the data network;
    an external power supply and a separate independent power supply; and
    means for sending a status update through the analog connection means if the status of the external power supply changes wherein the independent power supply supplies power to the remote management station if the external power supply for the computer data network has failed.

2. The management system for a computer network described in claim 1 wherein the analog connection means is a modem.

3. The management system for a computer network described in claim 1 wherein the analog connection means is a modem capable of communicating through a network selected from the group consisting of a Public Switched Telephone Network or an Integrated Services Digital Network.

4. The management system for a computer network described in claim 1 wherein the at least one digital communication means is selected from the group consisting of a local area network, a serial interface or a network connection.

5. The management system for a computer network described in claim 1 wherein the at least one digital communication means supports at least one protocol selected from the group consisting of Transmission Control Protocol/Internet Protocol, Simple Network Management Protocol, Telnet, Hypertext Transfer Protocol or Secure Shell.

6. The management system for a computer network described in claim 1 wherein the at least one digital communication means includes a network interface for reporting a status of computer equipment attached to the remote management station to a network management station.

7. The management system for a computer network described in claim 1 wherein the at least one digital communication means includes a network interface which allows for remote configuration of the remote management station.

8. The management system for a computer network described in claim 1 further comprising a means for authenticating a remote administrator through use of the at least one digital communication means.

9. The management system for a computer network described in claim 1 further comprising a means fox authorizing access to remote management station or to the computer data network for a remote administrator through use of the at least one digital communication means.

10. The management system for a computer network described in claim 1 further comprising an internal means for authenticating a remote administrator.

11. The management system for a computer network described in claim 1 further comprising an internal means for authorizing access to the remote management station or the computer data network for a remote administrator.

12. The management system for a computer network described in claim 1 further comprising a means for controlling a remote administrator's access to the remote management station or the computer data network.

13. The management system for a computer network described in claim 1 further comprising a means for encrypting communications carried by the analog communication system.

14. The management system for a computer network described in claim 1 further comprising a means for monitoring the status of the at least one digital communication means.

15. The management system for a computer network described in claim 1 further comprising a means for monitoring the status of the at least one digital communication means and a means for sending a status update through the analog connection means if the status changes.

16. The management system for, a computer network described in claim 1 further comprising a means for monitoring the status of the analog connection means.

17. The management system for a computer network described in claim 1 further comprising a means for monitoring the status of the analog connection means and a means for sending a status update through the at least one digital communication means if the status changes.

18. The management system for a computer network described in claim 1 wherein the computer data network has a power supply and further comprising a means for monitoring the power supply of the computer data network.

19. The management system for a computer network described in claim 1 further comprising a means for remotely interrupting power to a device connected to tile remote management station.

20. The management system for a computer network described in claim 1 further comprising a means for monitoring connection attempts made through the analog connection means.

21. The management system for a computer network described in claim 1 further comprising a means for selectively blocking connection attempts made through the analog connection means.

22. The management system for a computer network described in claim 1 further comprising a means for a remote administrator to connect to the management system in an administrative mode through the analog connection means by using a specially configured modem.

23. A management system for a computer network, comprising: an embedded processor; a modem for connecting to an analog communication system; at least one digital communication means for connecting to the computer network, wherein the at least one digital communication means includes: a network interface for reporting a status of the computer network to a network management system; and a network interface which allows for remote configuration of the computer network management system; a means for authenticating a remote user; a means for authorizing access to the management system for a remote user; a means for controlling a remote user's access to the computer network management system; a means for encrypting communications carried by the analog communication system; a means for monitoring the status of the at least one digital communication means; a means for sending a status update through the analog connection means if the status of the at least ore digital communication means changes;

a means for monitoring the status of the analog connection means; a means for sending a status update through the at least one digital communication means if the status of the analog connection means changes; a means for monitoring a power supply supplying power to the computer network; an independent power supply; a means for sending a status update through the analog connection means if the status of the power supply supplying power to the computer network changes wherein the independent power supply supplies power to the computer network management system if the power supply supplying power to the computer network has failed; a means for remotely interrupting power to a device connected to the computer network; a means for monitoring connection attempts made through the analog connection means; and a means for selectively blocking connection attempts made through the analog connection means.

24. A management system for a computer network, comprising: an embedded processor;

a modem for connecting to an analog communication system capable of communicating through a network selected from the group consisting of a Public Switched Telephone Network or an Integrated Services Digital Network; at least one digital communication means for connecting to the computer network selected from the group consisting of a local area network, a serial interface or a network connection, wherein the at least one digital communication means supports at least one protocol selected from the group consisting of Transmission Control Protocol/Internet Protocol, Simple Network Management Protocol, Telnet, Hypertext Transfer Protocol or Secure Shell and wherein the at least one digital communication means includes:

a network interface for reporting a status of the computer network management station; and a network interface which allows for remote configuration of the computer network management system; a means for authenticating a remote user; a means for authorizing access to the management system for a remote user; a means for controlling a remote user's access to the management system; a means for encrypting communications carried by the analog communication system;

a means for monitoring the status of the at least one digital communication means; a means for sending a status update through the analog connection means if the status of the at least one digital communication means changes; a means for monitoring the status of the analog connection means; a means for sending a status update through the at least one digital communication means if the status of the analog connection means changes; a means for monitoring a power supply supplying power to the computer network; an independent power supply; a means for sending a status update through the analog connection means if the status of the power supply supplying power to the computer network changes wherein the independent power supply supplies power to the computer network management system if the power supply supplying power to the computer network has failed; a means for remotely interrupting power to a device connected to the computer network; a means for monitoring connection attempts made through the analog connection means; and a means for selectively blocking connection attempts made through the analog connection means.

* * * * *